(12) United States Patent
Watkins

(10) Patent No.: US 9,464,567 B2
(45) Date of Patent: Oct. 11, 2016

(54) DUAL TIP SEALS FOR A ROTARY ENGINE

(75) Inventor: Barton W. Watkins, Knoxville, TN (US)

(73) Assignee: Power Source Technologies, Inc., Knoxville, TN (US)

( * ) Notice: Subject to any disclaimer, the term of this patent is extended or adjusted under 35 U.S.C. 154(b) by 158 days.

(21) Appl. No.: 14/115,523

(22) PCT Filed: May 3, 2012

(86) PCT No.: PCT/US2012/036361
§ 371 (c)(1),
(2), (4) Date: Nov. 4, 2013

(87) PCT Pub. No.: WO2012/151423
PCT Pub. Date: Nov. 8, 2012

(65) Prior Publication Data
US 2014/0069367 A1    Mar. 13, 2014

Related U.S. Application Data

(60) Provisional application No. 61/482,715, filed on May 5, 2011.

(51) Int. Cl.
| | |
|---|---|
| *F02B 53/00* | (2006.01) |
| *F02B 55/08* | (2006.01) |
| *F01C 1/12* | (2006.01) |
| *F01C 1/28* | (2006.01) |
| *F01C 19/00* | (2006.01) |
| *F01C 19/04* | (2006.01) |

(52) U.S. Cl.
CPC ............... *F02B 55/08* (2013.01); *F01C 1/123* (2013.01); *F01C 1/28* (2013.01); *F01C 19/005* (2013.01); *F01C 19/04* (2013.01)

(58) Field of Classification Search
CPC ...... F02B 55/08; F01C 19/005; F01C 1/123; F01C 1/28; F01C 19/04; F01C 19/02; F16J 15/16; F16J 15/3204; F16J 15/3232
USPC .................. 123/241; 418/113, 121, 225, 227; 277/357, 551, 562
See application file for complete search history.

(56) References Cited

U.S. PATENT DOCUMENTS

| | | | | |
|---|---|---|---|---|
| 3,142,440 A | * | 7/1964 | Schagg | F01C 19/10 418/117 |
| 3,711,229 A | * | 1/1973 | Kurio | 418/121 |
| 3,768,936 A | * | 10/1973 | McCormick | 418/142 |

(Continued)

*Primary Examiner* — Nicholas J Weiss
*Assistant Examiner* — Jason T Newton
(74) *Attorney, Agent, or Firm* — Knox Patents; Thomas A. Kulaga

(57) ABSTRACT

A biased dual tip seal arrangement for the rotor (106) of a rotary engine (102). The dual tip seals (100-T, 100-L) are located on opposite corners of the tip (130) of a planetary rotor (106). The rotor (106) orbits within a cutout (126) in a main rotor (108). The seals (100-T, 100-L) are biased away from the corners to make sealing contact with the sealing surfaces of the asymmetrical lobe (112) and the cutout (126) of the main rotor (108). Biasing is implemented with springs (1202, 1302, 1412) and with conduits (1006) that pressurize the area under the seals (100-T, 100-L). An asymmetrical lobe (112') includes a transition zone (802) on the surface of the lobe (112). In the transition zone (802), at least one seal (100-T, 100-L) on the tip (130) maintains contact with the surface (112') while alternating contact from one seal (100-T, 100-L) to the other.

18 Claims, 14 Drawing Sheets

(56) References Cited

U.S. PATENT DOCUMENTS

| | | | |
|---|---|---|---|
| 3,794,450 A * | 2/1974 | Klomp | F01C 19/02 |
| | | | 418/117 |
| 3,797,973 A * | 3/1974 | Prasse et al. | 418/118 |
| 3,830,600 A * | 8/1974 | Shimoji et al. | 418/113 |
| 3,865,522 A * | 2/1975 | Nardi | 418/161 |
| 3,880,555 A * | 4/1975 | Dega | 418/121 |
| 3,884,600 A * | 5/1975 | Gray | 418/61.2 |
| 3,885,799 A * | 5/1975 | Bibbens | 277/357 |
| 3,930,767 A * | 1/1976 | Hart | 418/113 |
| 3,955,904 A * | 5/1976 | Catterson | 418/121 |
| 3,972,660 A * | 8/1976 | Mangus | 418/121 |
| 3,990,819 A * | 11/1976 | Ritchie | 418/91 |
| 3,995,599 A * | 12/1976 | Shier | 123/203 |
| 4,018,548 A * | 4/1977 | Berkowitz | 418/61.2 |
| 4,029,444 A * | 6/1977 | Clarke | 418/120 |
| 4,395,206 A * | 7/1983 | Hoffmann | 418/61.2 |
| 4,481,920 A * | 11/1984 | Carr et al. | 123/246 |
| 4,666,383 A * | 5/1987 | Mendler, III | F01C 1/28 |
| | | | 123/246 |
| 4,760,701 A * | 8/1988 | David | F01B 3/0079 |
| | | | 123/228 |
| 5,039,290 A * | 8/1991 | Nardi | 418/227 |
| 5,410,998 A * | 5/1995 | Paul | F01C 19/04 |
| | | | 123/204 |
| 6,503,072 B2 * | 1/2003 | Nardi | 418/225 |
| 2005/0180874 A1* | 8/2005 | Wells | 418/113 |
| 2007/0119408 A1* | 5/2007 | Kang | 123/232 |
| 2007/0189914 A1* | 8/2007 | Atkins | 418/250 |
| 2008/0267805 A1* | 10/2008 | Watkins et al. | 418/61.1 |
| 2011/0165007 A1* | 7/2011 | Pekrul | F01C 1/3445 |
| | | | 418/145 |

* cited by examiner

DUAL TIP SEALS FOR A ROTARY ENGINE

STATEMENT REGARDING FEDERALLY SPONSORED RESEARCH OR DEVELOPMENT

Not Applicable

BACKGROUND OF THE INVENTION

1. Field of Invention

This invention pertains to seals within a rotary engine. More particularly, this invention pertains to the tip seals on the rotor of a rotary engine.

2. Description of the Related Art

Rotary engines, such as the rotary planetary engines disclosed in U.S. Pat. Nos. 6,932,047; 7,044,102; 7,350,501; 7,614,382; and 8,109,252 have rotating and orbiting elements that wipe or slide across an inside surface of the engine. Such types of rotary engines have a main rotor with circular cutouts. Inside each circular cutout is a planetary rotor that orbits the center of rotation of the main rotor. The planetary rotor has faces that sequentially cycle through intake, compression, combustion, and exhaust. Other rotary engines include those such as the Wankel engine. These engines operate with a different configuration than described herein. For example, the Wankel-type engines operate with a rotor mounted on an eccentric with the rotor moving within a two-lobed cavity.

Unlike reciprocating engines that have piston rings that provide a seal between moving parts, rotary engines have multiple surfaces moving against each other in a non-linear fashion. The interface between these surfaces require a seal in order for the combustion chamber to maintain compression.

BRIEF SUMMARY OF THE INVENTION

According to one embodiment of the present invention, a leading corner seal and a trailing corner seal for a planetary rotor tip is provided. The leading and trailing corner seals are biased away from the tip. In various embodiments, the leading and trailing corner seals are biased by springs.

One type of rotary engine includes an internal cavity, a main rotor, and a plurality of planetary rotors. The planetary rotors orbit around the main rotor. The main rotor has cutouts within which a planetary rotor rotates. Each planetary rotor has multiple vanes, which extend radially from the center of the planetary rotor and terminate at tips. Each vane has a leading face and a trailing face. The vane has a substantially squared-off tip where the two faces converge at the tip. The tips of the vanes have a tip surface and two corners; the leading corner and the trailing corner. The tip surface is bounded on each side by one of the two corners.

The internal cavity includes lobes that provide the surface on which the tips of the vanes pass during operation. The four internal combustion cycles of the rotary engine, intake, compression, combustion, and exhaust, occur in chambers defined, in part, by either a leading face or a trailing face. While one chamber provides an enclosure for combustion, the other chambers formed by the same rotor provide enclosures for other cycles. The planetary rotor is shaped such that the tip of each vane separates two such chambers.

The two chambers are separated by a vane having a dual tip seal arrangement. The dual tip seal arrangement includes a leading corner seal, or leading seal, and a trailing corner seal, or trailing seal. The seals maintain a pressure boundary and accommodate thermal expansion and the manufacturing tolerances of engine components. The leading corner seal extends along a portion of the surface of the tip and a portion of the leading face to form a raised surface at a corner of the vane. The leading corner seal has a variable radius surface that provides a smooth engagement of the sealing surfaces in the engine, while maintaining a compliant and durable seal. The trailing corner seal protrudes from the trailing corner of the tip and has a constant radius for sealing. The leading and trailing corner seals are biased away from the tip by a spring. In another embodiment, each seal is biased away from the tip by a port that extends from the adjacent side of the vane to the space under the seal. When the chamber defined by the adjacent side is pressurized, the force of the pressure pushes the seal away from the tip, thereby increasing the bias force. In this way, the leading and trailing corner seals accommodate dimensional variations caused by thermal expansion of the various components and manufacturing tolerances.

For a rotary engine, the housing defines an asymmetrical lobe that provides a transition zone where the leading corner seal and the trailing corner seal in the tip of the rotor alternate engagement with the surface of the lobe. The transition zone lies between a trailing zone and a leading zone. The leading corner seal performs the sealing function while the tip traverses the leading zone. The trailing corner seal performs the sealing function while the tip traverses the trailing zone. In the transition region, both the leading and the trailing corner seals engage the lobe as the vane transitions from the trailing seal to the leading seal. In this way, a sealed interface is maintained between the tips of the vanes and the sealing surface of the lobe as the tips traverse the leading, transition, and trailing zones.

The leading and trailing corner seals are contoured such that the gap between the tip of the planetary rotor and the sealing surface of the lobe, or lobe surface, is filled. The lobe is asymmetric in that each arcuate section of the lobe includes a blended region that joins two dissimilar radii, one radius forming the leading zone and the other radius forming the trailing zone. The blended region is the transition zone. The transition zone is where the leading seal transitions from the free state to the sealing state and the trailing seal transitions from the sealing state to the free state. In the trailing zone, the trailing corner seal is in the sealing state, that is, it bears on the lobe surface to separate the two chambers divided by the vane. Also, in the trailing zone, the leading edge seal is in the free state, that is, the leading edge seal is not in contact with the lobe surface. In the leading zone, the leading corner seal is in the sealing state and the trailing corner seal is in the free state. In the transition zone, the leading and trailing corner seals are both in contact with the lobe surface.

The leading corner seal is configured to fill a leading gap between the planetary rotor and the lobe surface and the sealing surface of the cutout, or forward surface, in the main rotor. The leading gap develops as the tip of the planetary rotor moves from the leading zone of lobe surface to the forward surface of the cutout. As the main rotor approaches the bridge, the leading corner seal fills the gap between the outer rim of the main rotor and the bridge until the outer rim forms a dynamic seal with the bridge.

The trailing corner seal has an arcuate surface that projects away from the trailing corner of the tip. A trailing gap develops when the tip of the planetary rotor moves from the rear surface of the cutout onto the trailing zone of the lobe surface. Similar to the leading gap, the trailing gap is also an opening between the outer rim of the main rotor and the bridge. The trailing corner of the vane approaches the trailing zone of the lobe surface in a tangent path such that an arcuate shape is sufficient to maintain a seal between the chambers on either side of the vane. In this way, the tip of the planetary rotor separates the two chambers divided by a vane as it enters and exits the cutout of the main rotor.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

An apparatus for dual tip seals for the rotor of a rotary engine is disclosed. The embodiment illustrated in the figures is a pair of dual tip seals used in a rotary engine where planetary rotors orbit around the main rotor. As used herein, the suffixes or the hash or apostrophe appended to a reference number indicate a particular embodiment or configuration of a component. When the reference number is used without the suffix, the generic component is being referenced, for example the seal 100 refers generically to the seals, whereas 100-T, 100-L, etc. refer to specific configurations of the two seals 100.

Figure 1:
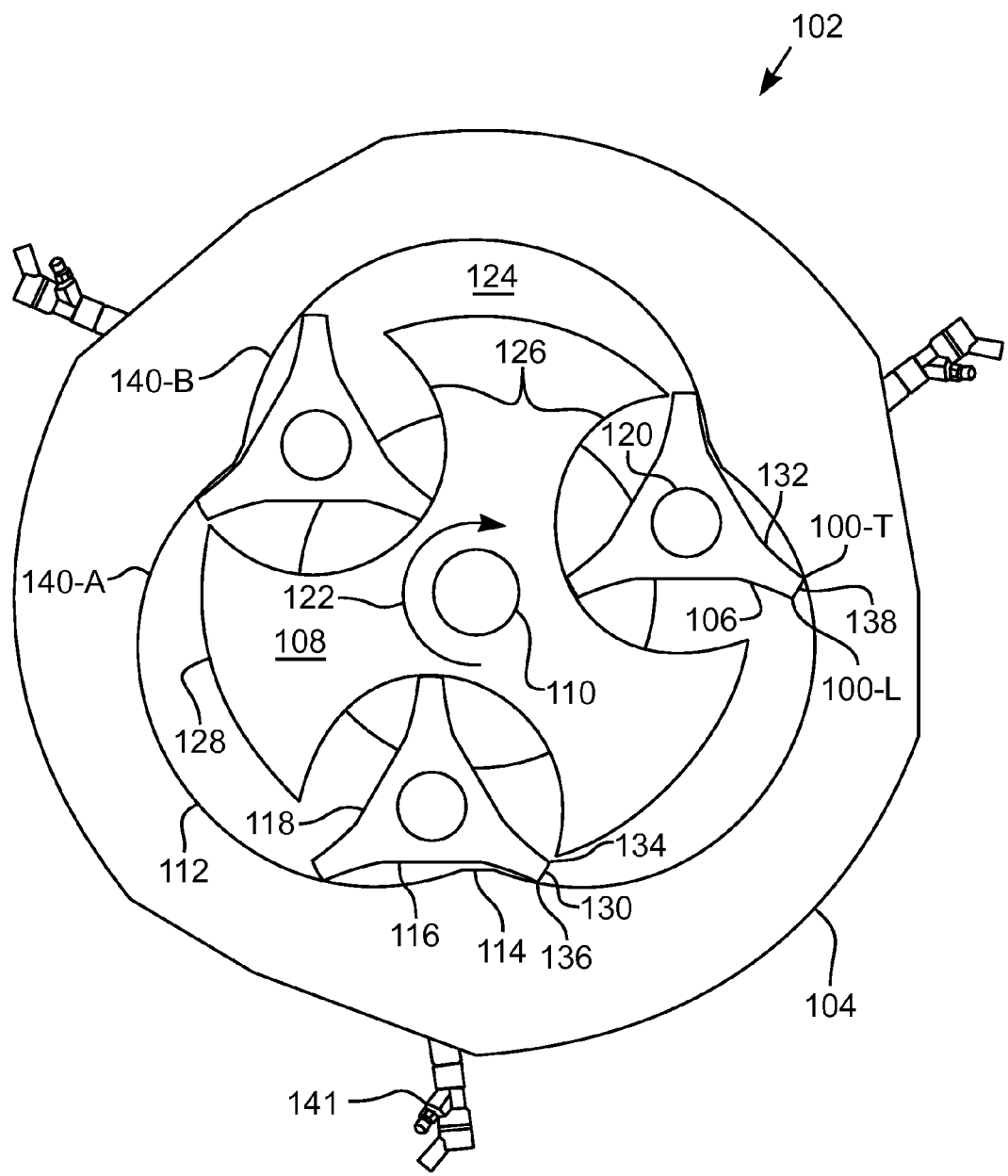
FIG. 1 is an internal view of one embodiment of a rotary engine having multiple planetary rotors with dual tip seals.

FIG. 1 illustrates an internal view of one embodiment of a rotary engine 102 having multiple planetary rotors 104 with dual tip seals 100-T, 100-L. The rotary engine 102 includes a housing 104, a main rotor 108, and a plurality of planetary rotors 106. The housing 104 has an internal cavity 124 in which rotates the main rotor 108. The main rotor 108 has three cutouts 126 in which the planetary rotors 106 orbit about the main shaft 110. The illustrated engine is a planetary piston rotary engine, such as that disclosed in U.S. Pat. Nos. 6,932,047; 7,044,102; 7,350,501; 7,614,382; and 8,109,252, all incorporated by reference. However, those skilled in the art will recognize that the invention is not limited to use only with such rotary engines.

The internal cavity 124 is defined by three lobes 112. Each lobe 112 has one fuel injector 141 that provides fuel for combustion in the engine 102. Each pair of adjacent lobes 112 is joined at a bridge 114. The main rotor 108 rotates clockwise 122 on the main shaft 110 inside the housing cavity 124. The main rotor 108 has three circular cutouts 126 that each contain one planetary rotor 106. The main rotor 108 also has three sections of outer rim 128 that engage the bridge 114 during selected positions of the main rotor 108 as the main rotor 108 rotates inside the cavity 124.

Each planetary rotor 106 has three vanes 132, which extend radially from the center of the planetary rotor 106 and terminate at tips 130. The tips 130 have a tip surface 138 and two corners: the leading corner 134 and the trailing corner 136. The tip surface 138 is bounded on each side by one of the two corners 134, 136. Each vane 132 has a first face 116 and a second face 118. The two faces 116, 118 converge at the tip surface 138. The four engine cycles of the rotary engine 102, intake, compression, combustion, and exhaust, occur in chambers 140 defined, in part, by either a first face 116 or a second face 118. The planetary rotor 106 is shaped such that the tip 130 of each vane 132 separates two such chambers 140-A, 140-B.

As illustrated in FIG. 1, the planetary rotors 106 orbit in the clockwise direction 122 around the main shaft 110 inside the cutouts 126 of the main rotor 108. Each planetary rotor 106 does not rotate about its shaft 120, but maintains a stationary position relative to the shaft 120. That is, the first face 116 of the planetary rotor 106 shown facing downward in FIG. 1, remains facing downward as the planetary rotor 106 orbits the main shaft 110. The main shaft 110 and the planetary rotor shafts 120 are connected to a planetary gear assembly (not illustrated) that maintains the orbital position of the planetary rotors 106 as they orbit the main shaft 110.

The illustrated rotary engine 102 operates with three planetary rotors 106 that are located 120 degrees apart. Each planetary rotor 106 has three vanes 132 that are located 120 degrees apart, each one having dual tip seals 100-T, 100-L. The following discussion is applicable to each of the vanes 132 on each of the planetary rotors 106 at some point along a 120 degree rotation of the main rotor 108 even though the discussion will now focus on a single tip having dual tip seals 100-T, 100-L.

Figure 2A:
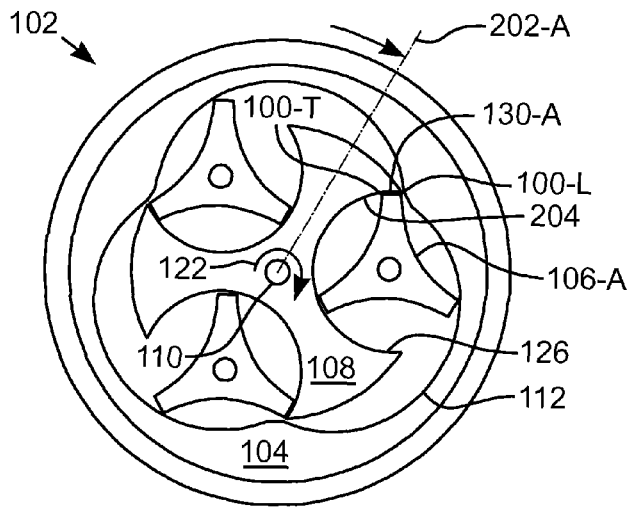
FIG. 2A is an internal view of the planetary rotors with a vertical tip about to enter the main rotor cutout.
Figure 2B:
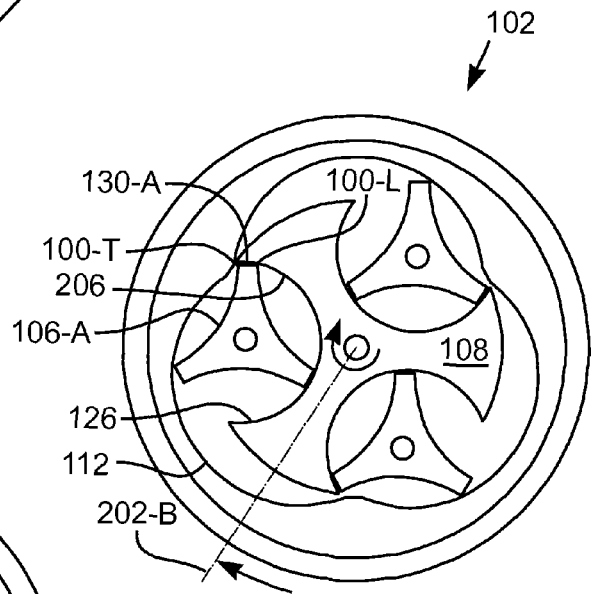
FIG. 2B is an internal view of the planetary rotors with a vertical tip about to exit the main rotor cutout.
Figure 2C:
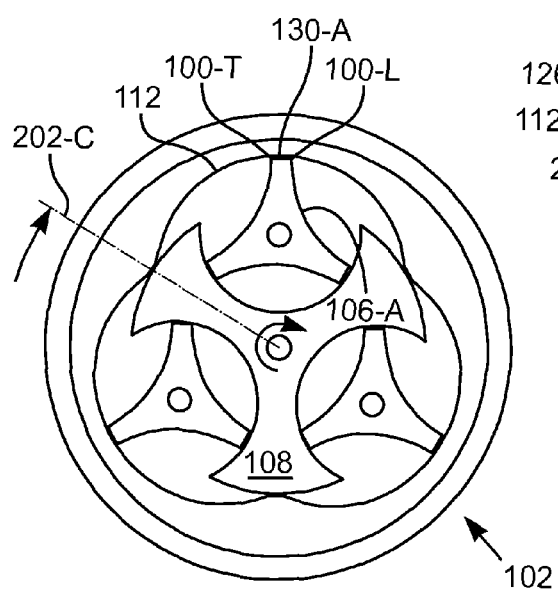
FIG. 2C is an internal view of the planetary rotors with a vertical tip adjacent a transition zone.

FIGS. 2A-C illustrate internal views of the rotor 108 and planetary rotors 106 at different positions as the planetary rotor 106-A orbits within the rotary engine 102. In the figures, the main rotor 108 rotates clockwise 122. The reference line 202 identifies the orientation of a single arm of the main rotor 108. As the main rotor 108 rotates about the main shaft 110, the reference line 202 moves with the main rotor 108.

In FIG. 2A, the reference line 202-A is at about the one o'clock position. The tip 130-A of the planetary rotor 106-A is shown in a position as it transitions from the lobe 112 to the cutout 126. The tip 130-A is always pointing upward as shown throughout the orbit of the planetary rotor 106-A. The cutout 126 is shaped to provide a surface on which the tip 130-A traverses during the orbit of the planetary rotor 106-A. The surface of the cutout 126 that receives the tip 130 of a planetary rotor 106 at the illustrated transition is the forward surface 204. The positions of the tip 130-A, the cutout 126, and lobe 112 are fixed such that manufacturing tolerances and thermal expansion result in gaps between the tip 130-A and the surfaces of the cutout 126 and the lobe 112. The tip seals 100-L, 100-T are biased away from the tip 130-A to maintain a compliant and durable seal throughout the orbit of the planetary rotor 106-A around the main shaft 110.

In FIG. 2B, the reference line 202-B is at about the seven o'clock position. The tip 130-A traverses the cutout 126 from the forward surface 204 to the rear surface 206 during the rotation of the rotor 108 from the reference lines 202-A and the reference line 202-B. The surface of the cutout 126 where the tip 130 of a planetary rotor 106 leaves the cutout 126 is the rear surface 206. The tip 130-A is shown in a position as it transitions from the rear surface 206 to the lobe 112. The cutout 126 is a continuous, smooth radius. The leading and trailing corner seals 100-L, 100-T are both in continuous contact with the cutout 126 during traversal of the cutout 126. When the tip 130-A transitions from the rear surface 206 to the lobe 112, the trailing corner seal 100-T contacts the lobe 112.

In FIG. 2C, the reference line 202-C is at about the 10 o'clock position. The tip 130-A is at the center of the lobe 112. At the center of the lobe 112, the leading and trailing corner seals 100-L, 100-T are both in contact with the lobe 112. As the tip 130-A approaches the center of the lobe 112, the leading corner seal 100-L gradually moves from a free state, that is, a state where no contact is made with a surface, closer to the lobe 112 until it transitions to a sealing state where contact is made with the lobe 112. As the tip 130-A moves from the position illustrated in FIG. 2C to the position illustrated in FIG. 2A, the trailing corner seal 100-T gradually moves away from the lobe 112 transitioning from a sealing state to the free state where it is no longer in contact with the lobe 112.

Figure 3:
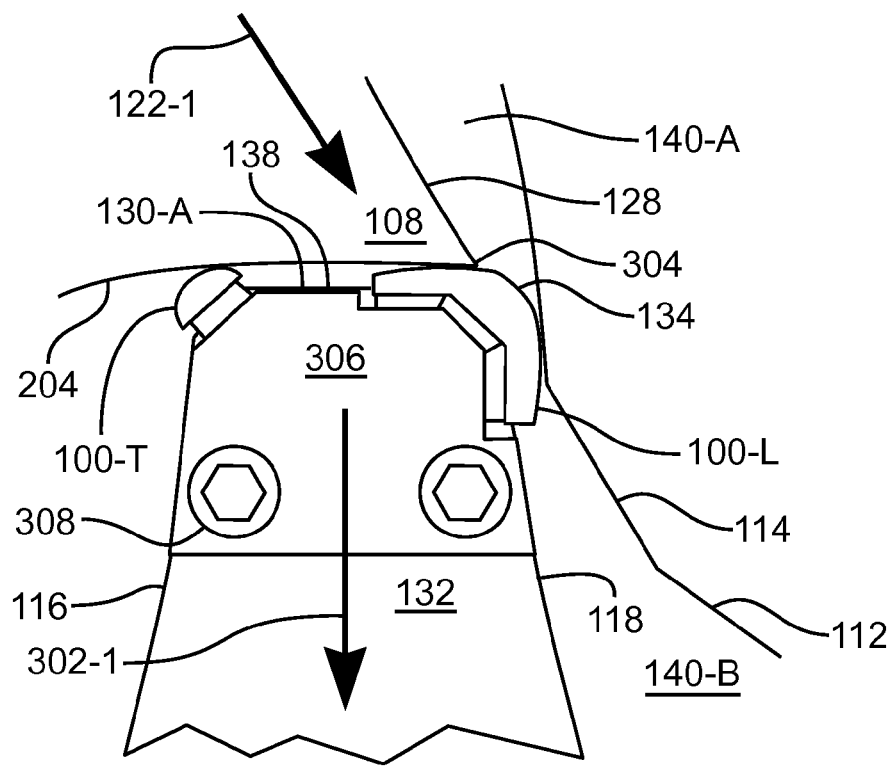
FIG. 3 is a partial plan view of the tip in the position illustrated in FIG. 2A where the vertical tip is moving from the lobe surface to the forward surface of the cutout.

FIG. 3 illustrates a partial plan view of the tip 130-A in the position illustrated in FIG. 2A where the tip 130-A is moving from the lobe 112 to the forward surface 204 of the cutout 126. The tip 130-A includes a leading seal 100-L and a trailing seal 100-T. The leading seal 100-L projects beyond the tip surface 138 and projects beyond the second surface 118. The projecting surface of the leading seal 100-L has a contour shaped to maintain a sealing connection with the cutout 126 and the lobes 112. The illustrated embodiment of the trailing seal 100-T has a arcuate shape that protrudes beyond the tip surface 138 and the first surface 116.

The forward surface 204 of the cutout 126 is in contact with the corner seals 100. The corner seals 100 are biased away from the tip 130-A such that a sealing connection is maintained at the forward surface 204. The leading corner seal 100-L is also in contact with the lobe 112. The leading corner seal 100-L is biased away from the tip 130-A such that a sealing connection is maintained with the lobe 112. The leading corner seal 100-L is a boundary between the two chambers 140-A, 140-B. The leading corner seal 100-L seals the interface between the tip 130-A and the forward surface 204 and between the first face 116 and the lobe 112.

The vane 132 includes an end cap 306. The end cap 306 retains the leading and trailing corner seals 100-L, 100-T. In the illustrated embodiment, the end cap 306 is secured to the vane 132 by two fasteners 308. In another embodiment, the cover is retained by one fastener 308. In other embodiments, the end cap 306 is retained by an adhesive, or the end cap 306 is welded to the vane, or the end cap 306 is retained by a friction fit.

In the illustration, the instantaneous direction 302-1 of the tip 130-A is substantially downward. The instantaneous direction 122-1 of the forward surface 204 is downward, and also angled toward the tip 130.

Figure 4:
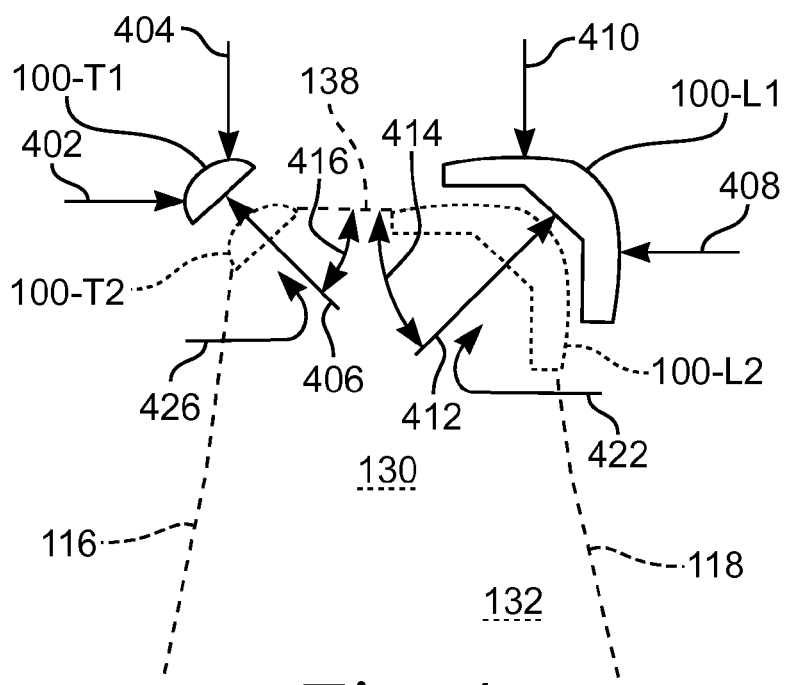
FIG. 4 is a symbolic view of the seals showing the balance of forces and range of motion of the leading and trailing corner seals during operation of the rotary engine.

FIG. 4 illustrates a partial plan view of a tip 130 showing the balance of forces and range of motion of the leading and trailing corner seals 100-L, 100-T during operation of the rotary engine 102. The leading and trailing corner seals 100-L, 100-T are rigid bodies such that any force causing a part of the body to move causes the whole body to move together. The leading and trailing corner seals 100-L, 100-T are biased to move away from the tip 130 at angles 414, 416. In the illustrated embodiment, the leading corner seal 100-L is angled approximately 42.5 degrees 414 from the surface 138 of the tip 130 and the trailing corner seal 100-T is angled approximately 45 degrees 416 from the surface 138 of the tip 130. In various embodiments, the angles 414 and 416 vary to accommodate the engine configuration and performance requirements.

The leading and trailing corner seals 100-L, 100-T are biased away from the tip 130. The corner seals 100-L1, 100-T1 are shown in the free state position where the seals 100-L1, 100-T1 are restrained from moving beyond a specified distance from the tip 130. When providing a sealing connection, the corner seals 100-L, 100-T are depressed toward the tip 130 according to the gap between the surfaces being sealed. The corner seals 100-L2, 100-T2 (shown with dashed lines) are in the fully depressed state position where the corner seals 100-L2, 100-T2 are restrained from being depressed further. The fully depressed position is where the outer surfaces of the corner seals 100-L2, 100-T2 still protrude beyond the surfaces 116, 118, 138 of the tip 130. The locations of the corner seals 100-L, 100-T are exaggerated in the figure for illustration purposes. In one embodiment, the maximum travel from the free state to the fully depressed state is approximately 0.004 inches.

The corner seals 100 are restrained in their movement such that they travel in the direction of the biasing force vectors 406, 412. The tip 130 and the two faces 116, 118 of the vane 132 encounter opposing surfaces of the lobe 112 and the cutout 126 during the engine cycle. The gap between the components 112, 116, 118, 126, 130 varies according to the manufacturing tolerances, thermal expansion caused by the heat generated by the operating engine 102, and component wear. The corner seals 100 are biased to move to fill the gap by contacting the opposing surface. The corner seal biasing force is shown as force vectors 406, 412. In various embodiments, the biasing force 406, 412 has two components, namely, a spring bias and a pressure bias force 426, 422 from the pressure in the adjacent chamber. The biasing force vectors 406, 412 are balanced by the contact force vectors 402, 404, 408, 410.

As the gap between the tip 138 and the other surface 112, 204 varies, the contact force vectors 402, 404, 408, 410 applied to the leading and trailing corner seals 100-L, 100-T varie. During the engine cycle, forces at various angles are applied to the leading and trailing corner seals 100-L, 100-T. For illustration purposes, the forces experienced by the leading and trailing corner seals 100-L, 100-T are broken down into their basic x-axis 402, 408 and y-axis 404, 410 components. The biasing force vectors 406, 412 oppose the contact force vectors 402, 404, 408, 410 encountered during the engine cycle such that a compliant and durable seal is maintained.

For example, in FIG. 3, the contact force vectors 402, 404 are the components of the force applied to the trailing seal 100-T by the presence of the forward surface 204 of the main rotor 108 and the sliding, or frictional, force applied by the relative motion between the trailing seal 100-T and the forward surface 204. The contact force vectors 408 and 410 applied to the leading seal 100-L also arise, in part, from the presence of the forward surface 204 and the sliding, or frictional, force applied by the relative motion between the leading seal 100-L and the forward surface 204. Additionally, the contact force vectors 408 and 410 arise from the presence of the lobe 112 and relative motion between the lobe 112 and leading seal 100-L.

FIGS. 5A-D illustrate partial plan views representing the progression of a tip 130-A moving from the lobe 112 to the forward surface 204 of the cutout 126 as shown in FIG. 2A. Generally, the corner seals 100 are in contact with the lobe 112 and/or the cutout 126 throughout the engine cycle. The contact makes a sealing connection that isolates two chambers 140. The configuration of the chamber 140 varies as the main rotor 108 rotates in the cavity.

Figure 5A:
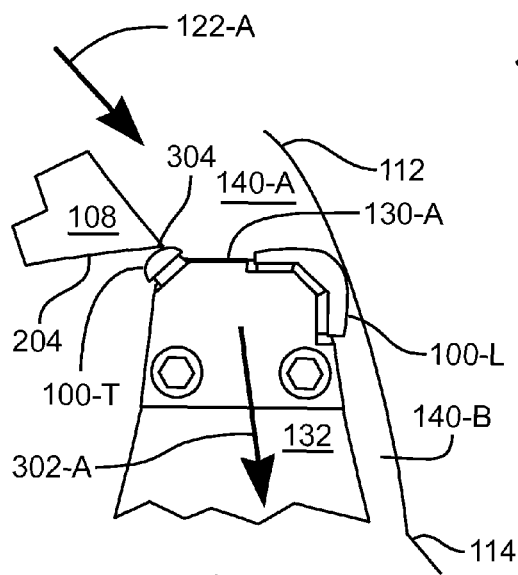
FIG. 5A-D are partial plan views representing the progression of a tip moving from the lobe surface to the forward surface of the cutout.

In FIG. 5A, the leading corner seal 100-L is in the sealing state because the leading corner seal 100-L is in contact with the lobe 112. The forward surface 204 of the cutout 126 in the main rotor 108 has made initial contact with the trailing corner seal 100-T. The leading corner seal 100-L forms a boundary between chambers 140-A and 140-B.

The arcuate shape of the trailing corner seal 100-T provides a sufficient lead-in surface to prevent stubbing for the extreme case where the forward point 304 contacts the trailing corner seal 100-T. The location in which the forward point 304 contacts the trailing corner seal 100-T is such that the trailing corner seal 100-T is depressed inward toward the trailing corner 134 of the vane 132. The instantaneous direction 122-A of the forward surface 204 is substantially downward with a component toward the lobe 112. The instantaneous direction 302-A of the tip 130 is generally downward and angled toward the lobe 112. In other embodiments, the forward surface 204 has an arcuate configuration that allows the forward surface 204 to contact the trailing corner seal 100-T at a point on the forward surface 204 away from the forward point 304.

Figure 5B:
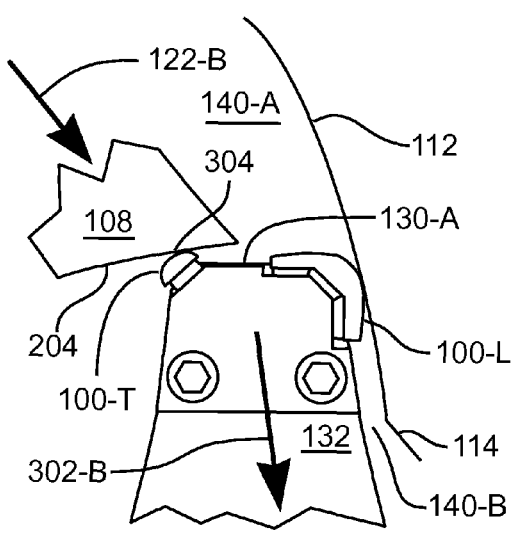

In FIG. 5B, the trailing corner seal 100-T is in contact with the forward surface 204. The leading corner seal 100-L now forms a boundary between two chambers 140-A and 140-B The forward point 304 is located above the tip 130 and is nearer to the leading corner seal 100-L than in FIG. 5A. The instantaneous direction 122-B of the forward surface 204 is still downward at about 45 degrees toward the tip 130-A. The instantaneous direction 302-B of the tip 130-A has changed to a substantially downward direction.

Figure 5C:
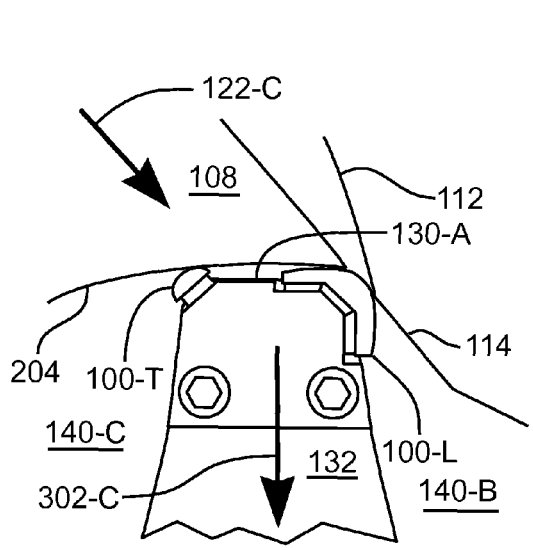

In FIG. 5C, the leading and trailing corner seals 100-L, 100-T are both in contact with the forward surface 204 of the cutout 126. The main rotor 108 is in position for the outer rim 128 to move past the bridge 114. The corner seals 100-L, 100-T form a boundary between two chambers 140-C and 140-B. The instantaneous direction 122-C of the forward surface 204 continues to become more downward than shown in FIGS. 5A and 5B. The tip 130-A has an instantaneous direction 302-C that is substantially downward.

Figure 5D:
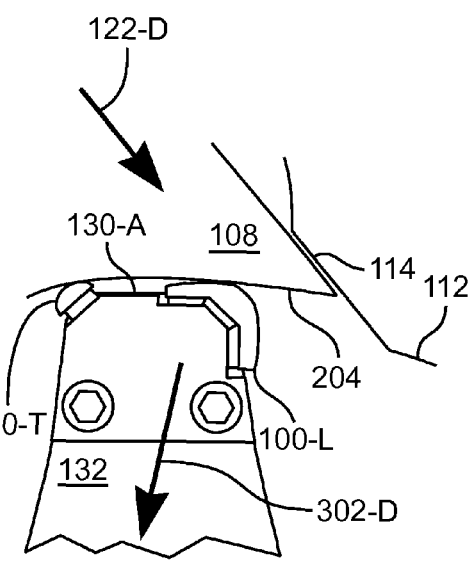

In FIG. 5D, the corner seals 100 are both in contact with the forward surface 204. The vane 132 is no longer in contact with the lobe 112. The forward surface 204 has an instantaneous direction 122-D even more downward than shown in FIG. 5C. The instantaneous direction 302-D of the tip 130-A is downward with an inward component toward the midpoint of the cutout 126 in which it traverses.

Figure 6:
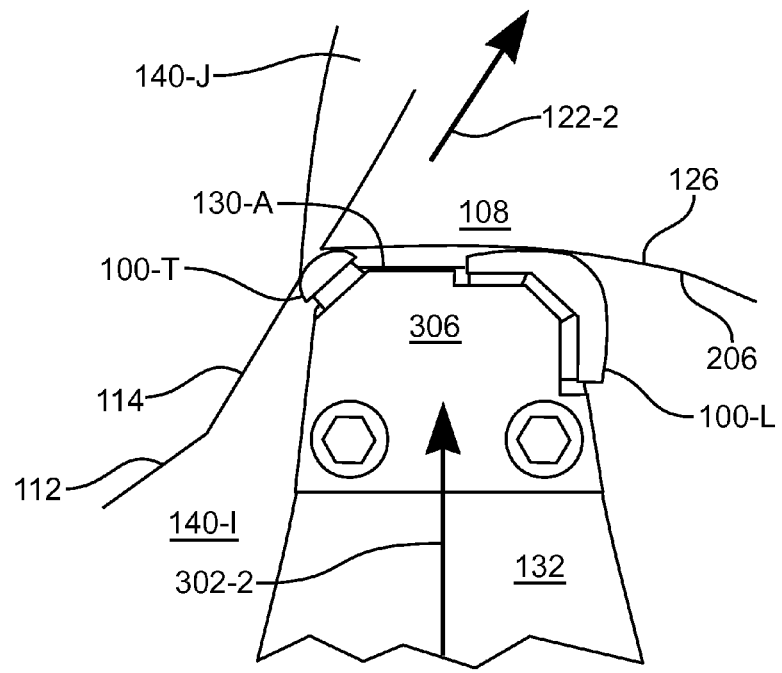
FIG. 6 is a partial plan view of a tip in the position illustrated in FIG. 2B where the tip is moving from the rear surface of the cutout to the lobe.

FIG. 6 illustrates a partial plan view of a tip 130-A in the position illustrated in FIG. 2B where the tip 130-A is moving from the rear surface 206 of the cutout 126 to the lobe 112. The rear surface 206 is in contact with the leading and trailing corner seals 100-L, 100-T. The lobe 112 is in contact with the trailing corner seal 100-T. The corner seals 100-L, 100-T are biased away from the tip 130-A such that a sealing connection is maintained at the rear surface 206 and the lobe 112. The trailing corner seal 100-T is a boundary between the two chambers 140-I, 140-J.

In the illustration, the instantaneous direction 302-2 of the tip 130-A is substantially upward. The instantaneous direction 122-2 of the rear surface 206 is upward and angled away from the lobe 112. The instantaneous directions 302-2, 122-2 of the tip 130-A and the rear surface 206 shown in the illustration are roughly opposite the instantaneous directions 302-2, 122-2 of the tip 130-A and the main rotor 108 shown in FIG. 3

Figures 7A, 7B:
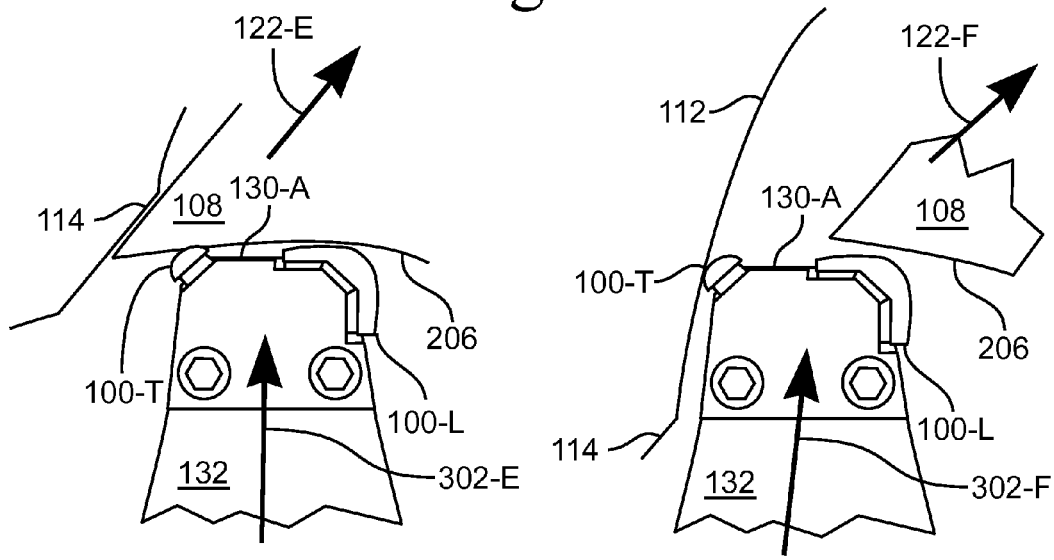
FIGS. 7A-B are partial plan views representing the progression of a tip moving from the rear surface of the cutout to the lobe.

FIGS. 7A-B illustrate partial plan views representing the progression of a tip 130-A moving from the rear surface 206 of the cutout 126 to the lobe 112. In FIG. 7A, the corner seals 100 are both in contact with the rear surface 206. The rear surface 206 has an instantaneous direction 122-E substantially upward with an angle away from the lobe 112. The instantaneous direction 302-E of the tip 130 is substantially upward.

In FIG. 7B, the corner seals 100-L, 100-T have moved from full contact with the rear surface 206 to the trailing corner seal 100-T making contact with the lobe 112. The trailing corner seal 100-T is in the sealing state, that is, the trailing corner seal 100-T is in contact with the lobe 112. The leading corner seal 100-L is in the free state, that is, the leading corner seal 100-L is fully extended outward, no longer contacting the rear surface 206. The rear surface 206 has an instantaneous direction 122-F substantially upward with an angle away from the lobe 112. The instantaneous direction 302-F of the tip 130-A is generally upward tangent to the curve of the lobe 112.

Figure 8:
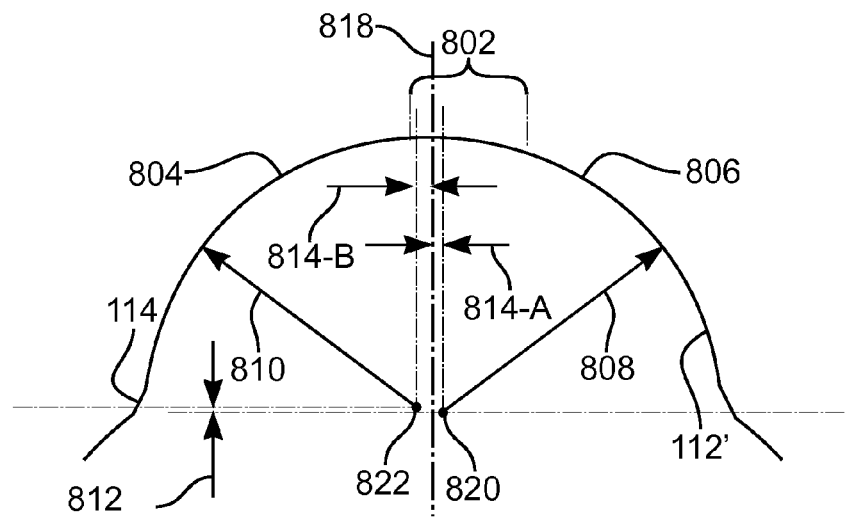
FIG. 8 is a partial plan view of one embodiment of a lobe that is asymmetrical.
Figure 9:
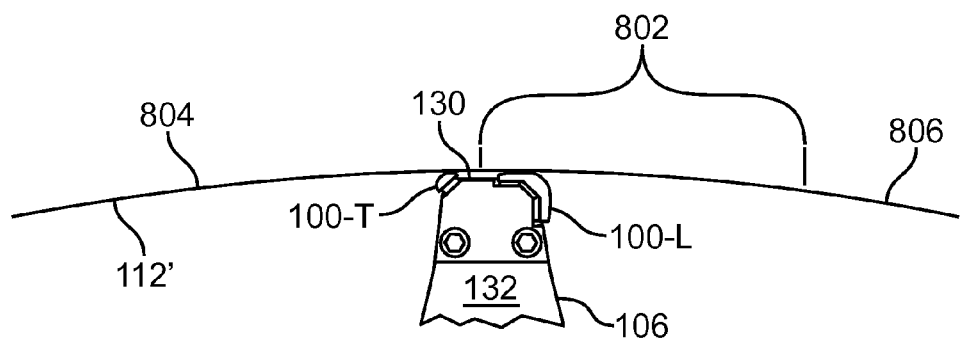
FIG. 9 is a partial plan view of the asymmetrical lobe of FIG. 8 with a tip traversing the transition region.

FIG. 8 illustrates a partial plan view of one embodiment of a lobe 112' that is asymmetrical. FIG. 9 illustrates a partial plan view of the asymmetrical lobe 112' of FIG. 8 with a tip 130 traversing the asymmetric lobe 112'. The tip 130-A shown in FIG. 2C is in the transition zone 802. The transition zone 802 is the region on the lobe 112 where the tip 130 moves from the trailing zone 804 to the leading zone 806. In the trailing zone 804, the tip 130 is oriented such that the trailing corner seal 100-T is in the sealing state and the leading corner seal 100-L is in the free state. After passing through the transition zone 802 and reaching the leading zone 806, the tip 130 is oriented such that the leading corner seal 100-L is in the sealing state and the trailing corner seal 100-T is in the free state.

Where the transition zone 802 is an extended length, a location exists on the lobe 112 where the leading and trailing corner seals 100-L, 100-T both are in the sealing state, that is, they both form a sealed connection with the lobe 112. For example, where two radii 808, 810 are joined at their tangent points by a straight line, the leading and trailing corner seals 100-L, 100-T both are in the sealing state, that is, they both form a sealed connection with the lobe 112.

The asymmetric lobe 112' is a cavity that lies within the housing 104 of a rotary engine 102. The asymmetric lobe 112' includes a trailing zone 804, a transition zone 802, and a leading zone 806 that combine to form a continuous arcuate shape. The trailing zone 804 has a radius 810. The leading zone 806 has a radius 808. The radii 808, 810 are sized to meet the specific performance requirements of the rotary engine 102. The trailing and leading zones 804, 806 are sized such that the radii 808, 810 are not necessarily identical.

The transition zone 802 is a region that joins the trailing and leading zones 804, 806. The transition zone 802 ensures that a continuous sealed connection exists between the lobe 112 and the tip 130. In the illustrated embodiment, the trailing zone 804 is defined by a trailing center 822 and a radius 810. The leading zone 806 is defined by a leading center 820 and a radius 808. The trailing center 822 is offset 814-B from the centerline 818 of the lobe 112. The centerline 818 passes through the axis of rotation of the main rotor 108 and bisects the lobe 112. The leading center 820 is offset 814-A from the centerline 818 of the lobe 112 in the opposite direction relative to the trailing offset 814-B. Also, the trailing center 822 is offset 812 along the centerline 818 from the leading center 820.

The transition zone 802 varies according to the geometry and performance requirements of the rotary engine 102. In one embodiment, the transition zone is asymmetric in both the x-axis and y-axis where the centers, 820, 822 of the radii 808, 810 are offset in both the x-axis 816 and at the centerline 818. In one such embodiment, the trailing zone 804 has a 4.689 inch radius 810 and the leading zone 806 has a 4.706 inch radius 808. The center 820 of the leading zone radius 808 has a 0.194 inch centerline offset 814-A. The center 822 of the trailing radius 810 has a 0.283 inch centerline offset 814-B. The centers 820, 822 of the radii 808, 810 have a 0.086 inch x-axis offset 812.

Figure 10:
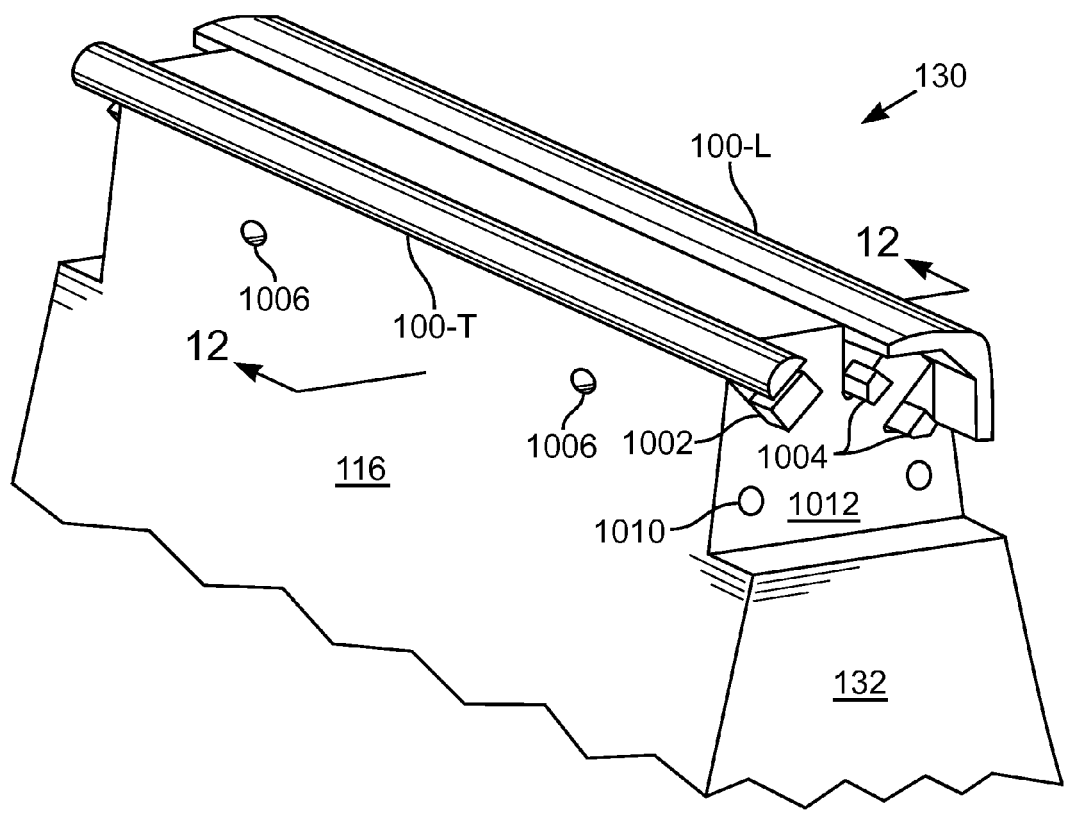
FIG. 10 is a perspective view of the tip shown in FIG. 3 with the end cap removed.
Figure 11:
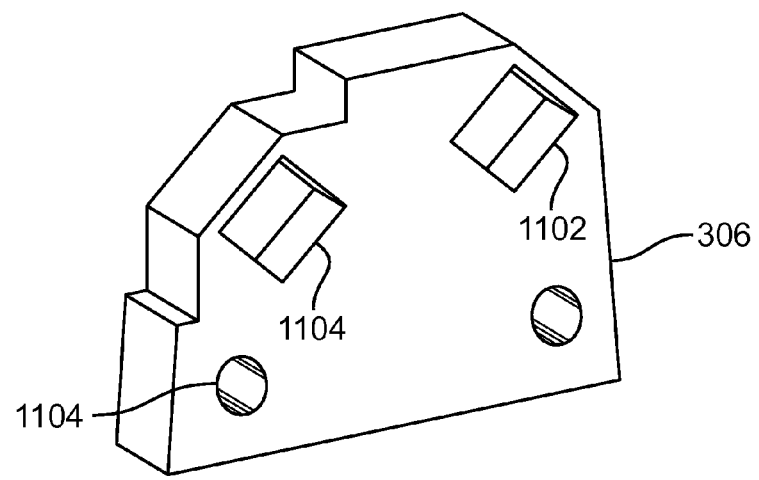
FIG. 11 is a perspective view of the back side of the end cap.

FIG. 10 illustrates a perspective view of the tip 130 shown in FIG. 3 with the end cap 306 removed. FIG. 11 illustrates a perspective view of one embodiment of an end cap 306. The tip 130 receives the two corner seals 100. The two corner seals 100-T, 100-L are retained in the tip 130 by the end cap 306. A retaining post 1002, 1004 extends from each corner seal 100-T, 100-L.

Each end of the trailing seal 100-T includes a retaining post 1002 extending from the surface 1012 of the vane 132. The retaining post 1002 moves in concert with the trailing seal 100-T. The retaining post 1002 is received by the opening 1102 in the end cap 306. The opening 1102 in the end cap 306 restrains the retaining post 1002 from moving beyond predetermined limits. In particular, the opening 1102 holds the trailing seal 100-T captive by preventing the retaining post 1002 from moving away from the vane 132 beyond the preset distance. With respect to movement of the trailing seal 100-T in the depressed direction, in various embodiments the seal 100-T is restrained by the opening 1102 or by bottoming out on the biasing device.

Each end of the leading seal 100-L includes a pair of retaining posts 1004 extending from the surface 1012 of the vane 132. The retaining posts 1004 move in concert with the leading seal 100-L. The retaining posts 1004 are received by the opening 1104 in the end cap 306. The opening 1104 in the end cap 306 restrains the retaining posts 1004 from moving beyond predetermined limits. In particular, the opening 1104 holds the leading seal 100-L captive by preventing the retaining posts 1004 from moving away from the vane 132 beyond the preset distance. With respect to movement of the leading seal 100-L in the depressed direction, in various embodiments the leading seal 100-L is restrained by the opening 1104 or by bottoming out on the biasing device.

The end cap 306 mates with the vane 132 at the vane surface 1012. In the illustrated embodiment, the vane surface 1012 includes two threaded holes 1010. The end cap 306 has two fastener holes 1104. The threaded holes 1010 in the vane surface 1012 align with the fastener holes 1104 in the end cap 306 to attach the cover 306 to the tip 130 using a threaded fastener. In other embodiments, there are no threaded holes 1010 and fastener holes 1104, and the end cap 306 is attached to the vane 132 using another securing device.

The corner seals 100 are accessed for service, in one embodiment, by removing the fasteners 308 from the side of the vane 132 to be accessed. The end cap 306 is removable by grasping the end cap 306 and sliding it in a direction perpendicular to the surface 1012 of the vane 132. To remove the corner seals, the end cap 306 is removed from both sides of the vane 132. The corner seals 100 lift out away from the corner 134, 136.

Positioned near the tip 130 on the first face 116 is a pair of ports 1006 that connect the chamber defined by the first face 116 to the space under the trailing seal 100-T. The second face 118 has a second pair of ports 1006 that connect the chamber defined by the second face 118 to the space under the leading seal 100-L.

Figure 12:
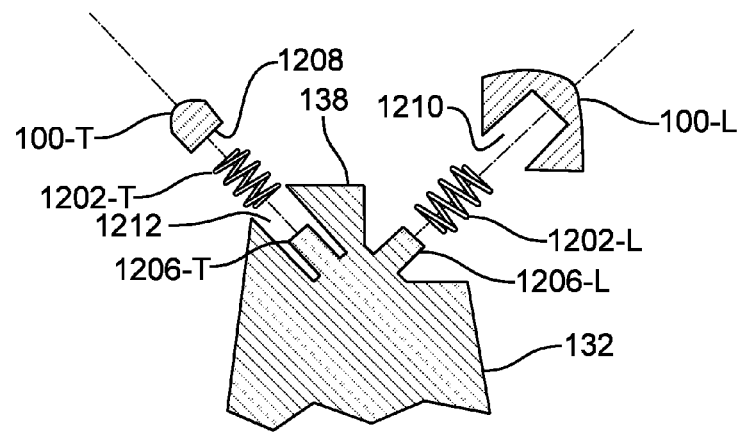
FIG. 12 is an exploded partial cross-sectional view of one embodiment of the corner seals with helical springs.

FIG. 12 illustrates a partial exploded cross-sectional view of one embodiment of the corner seals 100-T, 100-L with helical springs 1202, 1204. The corner seals 100-T, 100-L are biased away from the vane. In the illustrated embodiment, a channel 1212 receives the trailing seal 100-T. The channel 1212 has a series of posts 1206-T extending from the bottom of the channel 1212. Helical springs 1202-T are positioned on the posts 1206-T and contact the bottom 1208 of the trailing seal 100-T. In one embodiment, the posts 1206-T have a height sufficient to cause the trailing seal 100-T to bottom out at the fully depressed position of the seal 100-T2.

In the illustrated embodiment, the leading seal 100-L includes a channel 1210. Opposite the channel 1210 is a series of posts 1206-L extending from the vane 132. Helical springs 1202-L are positioned on the posts 1206-L and contact the bottom of the channel 1210 in the leading seal 100-T. In one embodiment, the posts 1206-L have a height sufficient to cause the trailing seal 100-T to bottom out at the fully depressed position of the seal 100-L2.

The retaining pins, or posts, 1202 are cylindrical. The coil springs 1202 are dimensioned and configured to fit over the diameter of the retaining pins 1202. The coil springs 1202 apply force against the corner seals 100-T, 100-L when the end cap retainer 1102 is attached to the vane 132.

Figure 13:
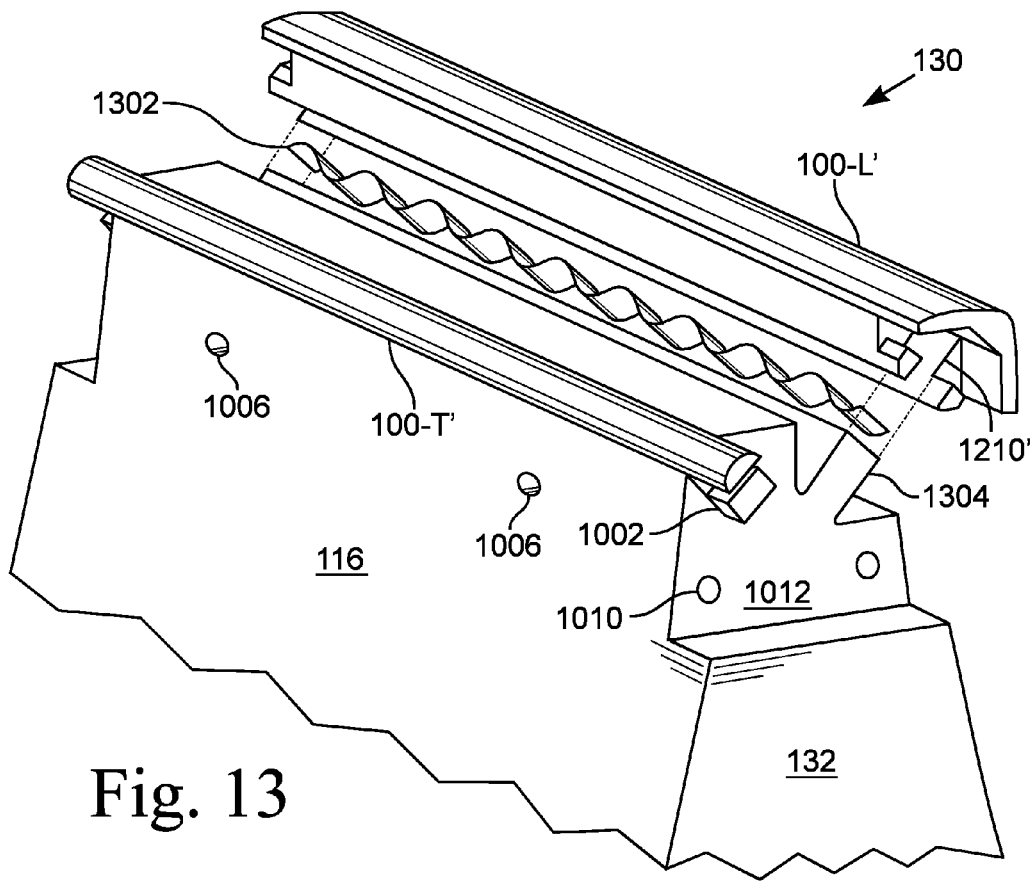
FIG. 13 is an exploded view of another embodiment of the corner seals with wave springs.

FIG. 13 illustrates another embodiment of the corner seals 100-T', 100-L' with wave springs 1302. In the illustrated embodiment, the seals 100-T', 100-L' are biased with wave springs 1402 that are positioned along the length of the corner seals 100-T', 100-L'. FIG. 13 shows the leading seal 100-L' with a channel 1210' configured to receive the wave spring 1302 and the spring seat 1304 protruding from the vane 132. The wave spring 1302 is a corrugated structure with the size and configuration of the corrugations determining the spring force to be applied by the spring. The illustrated spring seat 1304 extends the length between the opposing retaining posts 1004 on the leading seal 100-L'. The wave spring 1302 has substantially the same length. In this way the wave spring 1302 exerts an even biasing force to the leading seal 100-L' across the full length of the leading seal 100-L'. The trailing seal 100-T' has a substantially similar configuration as the leading seal 100-L'. Also visible in the illustrated embodiment are the pair of ports 1006 that connect the chamber defined by the first face 116 to the space under the trailing seal 100-T'.

Figure 14:
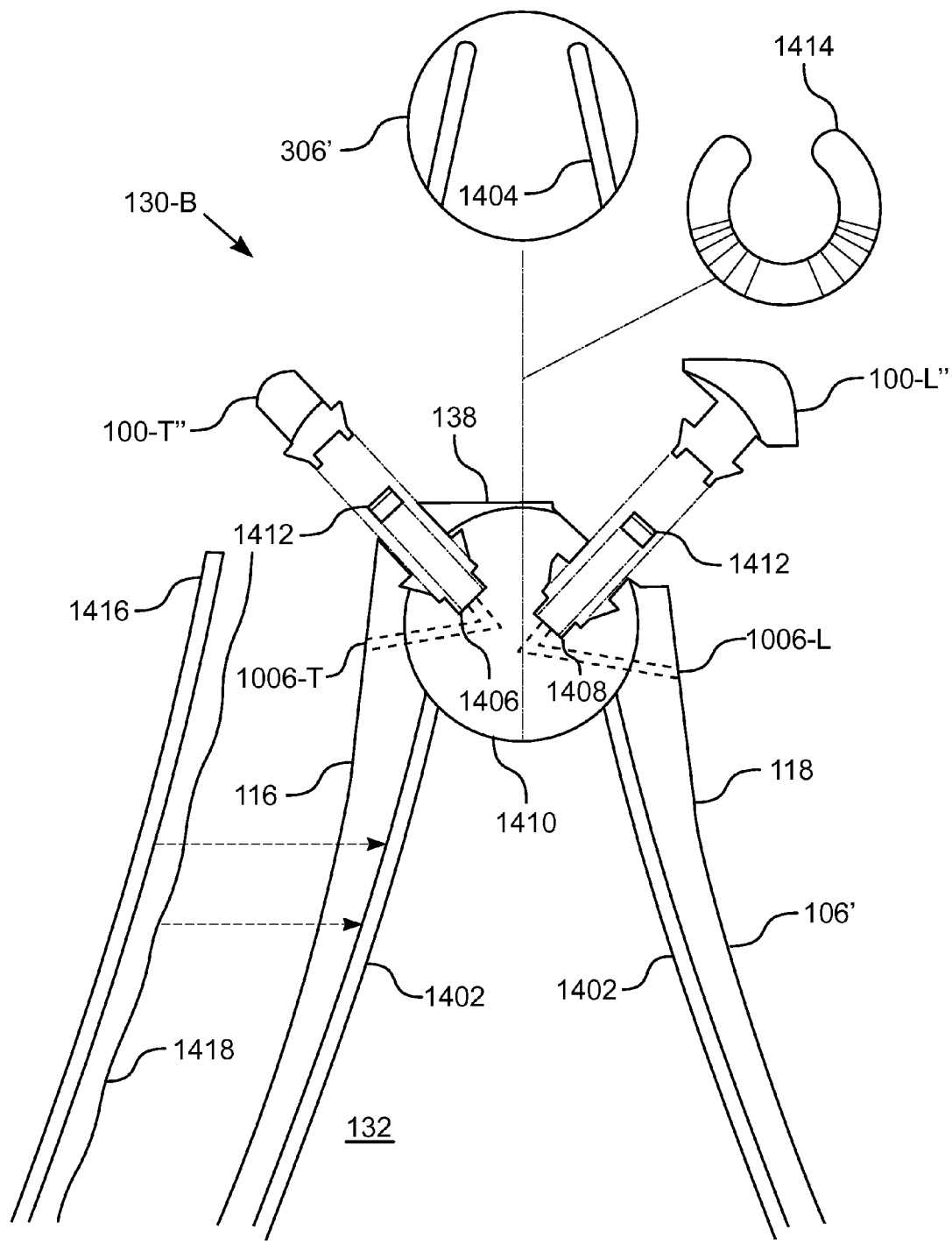
FIG. 14 is a partial plan view of another embodiment of a planetary rotor showing another embodiment of the seals and end cap.
Figure 15:
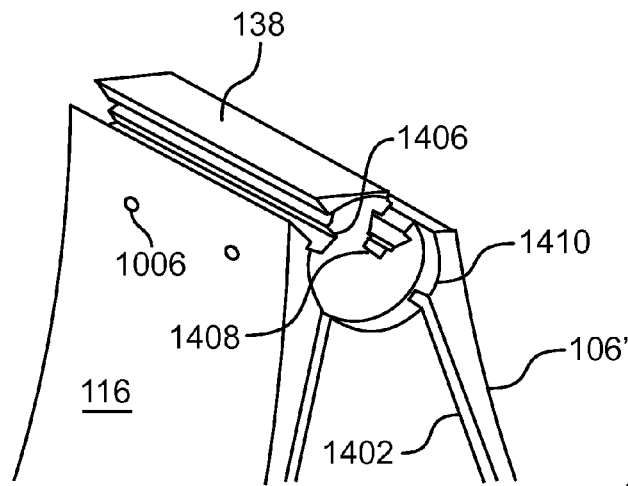
FIG. 15 is a partial perspective view of the embodiment of the planetary rotor illustrated in FIG. 14.
Figure 17:
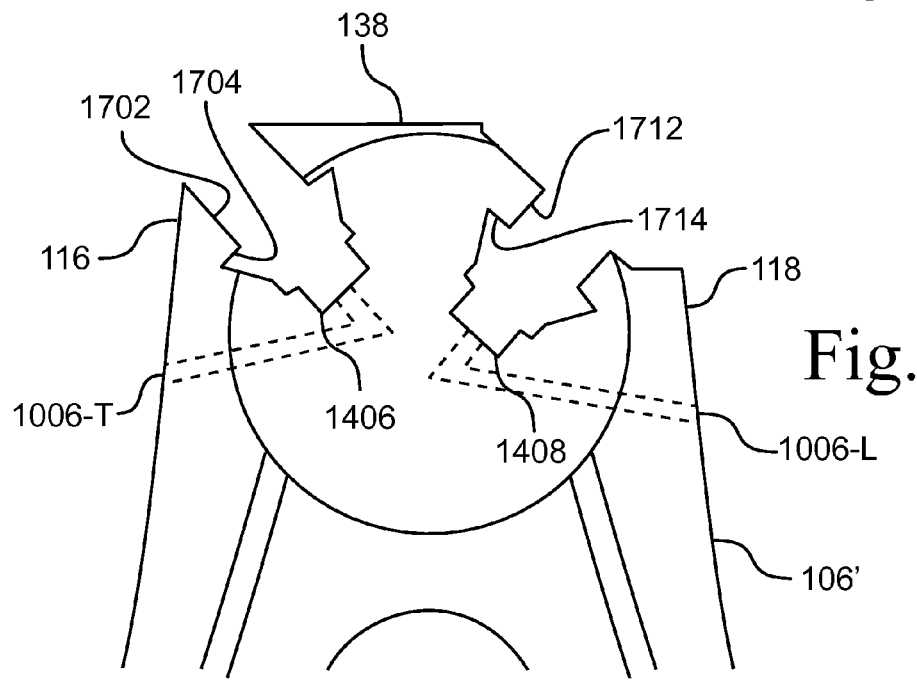
FIG. 17 is a partial plan view of the embodiment of the planetary rotor illustrated in FIG. 14.

FIG. 14 illustrates a partial plan view of another embodiment of a planetary rotor 106' showing another embodiment of the seals 100-T", 100-L" and end cap 306'. FIG. 15 illustrates a partial perspective view of the embodiment of the planetary rotor 106' illustrated in FIG. 14. FIG. 17 illustrates a partial plan view of the planetary rotor 106' illustrated in FIG. 14. Although the configuration of this embodiment differs from that of the tip 130-A illustrated in FIGS. 3 to 7B, the illustrated embodiment of the tip 130-B operates in substantially the same way.

The illustrated embodiment of the tip 130-B includes a leading seal 100-L" and a trailing seal 100-T". In one embodiment, the tip seals 100-L", 100-T" are an alloy steel such as 4140 annealed. Such material provides a wearable surface that allows the tip seals 100-L", 100-T" to be sacrificial and minimize the wear on the parts that move relative to the seals 100-L", 100-T". The seals 100-L", 100-T" fit into and are held captive in shaped slots 1408, 1406, respectively. Each tip seal 100-T", 100-L" has a leaf spring 1412 positioned between the bottom of the shaped slots 1408, 1406 and the respective tip seal 100-T", 100-L". The leading seal 100-L" projects beyond the tip surface 138 and projects beyond the second surface 118. The projecting surface of the leading seal 100-L" has a contour shaped to maintain a sealing connection with the cutout 126 and the lobes 112. The illustrated embodiment of the trailing seal 100-T" has an arcuate shape that protrudes beyond the tip surface 138 and the first surface 116.

An end cap spring 1414 and an end cap 306' fit into a cavity 1410 in the planetary rotor 106'. The illustrated end cap spring 1414 is a washer of spring steel with a twist such that the spring 1414 is non-planar. The end cap 306' slidably engages the cavity 1410 such that the end cap 306' is biased away from the planetary rotor 106'. The planetary rotor 106' includes slots 1402 that align with the end cap slots 1404 when the end cap 306' is positioned in the cavity 1410. The slots 1402, 1402 receive a seal spring 1418, such as a wire of spring steel with a wave-shaped configuration, and a seal 1416. The seal spring 1418 is positioned between the seal 1416 and the bottom of the slots 1402, 1404. The seal 1416 is biased away from the face of the planetary rotor 106' by the seal spring 1418 and the end cap 306'. In one embodiment, the seal 1416 has a rectangular cross section.

Shown in phantom are the ports 1006-T, 1006-L, which are conduits connecting each surface 116, 118 to its corresponding slot 1406, 1408. When the first face 116 defines a chamber that is pressurized, such as when combustion is occurring, the pressurized fluid enters the ports 1006-T on the first face 116 and pressurizes the space in the slot 1406, which causes a force to be applied to bias the trailing seal 100-T" away from the slot 1406 and tip 130-B. In this way, when the chamber is pressurized and in the most need for a strong seal, the pressurized fluid aid in increasing the bias force 406 on the trailing seal 100-T'". The pressurized force 426 is additive to the force contributed by the spring 1412. The ports 1006-L operate in a like manner for the leading seal 100-L".

Figure 16:
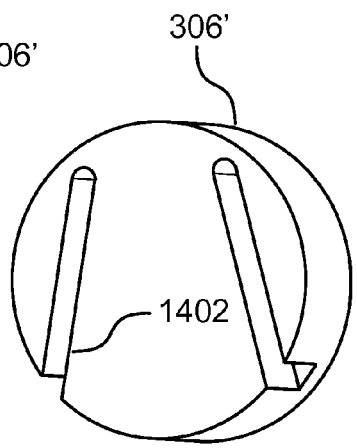
FIG. 16 is a perspective view of the embodiment of the end cap illustrated in FIG. 14.

FIG. 16 illustrates a perspective view of the embodiment of the end cap 306' illustrated in FIG. 14. The end cap 306' has a cylindrical configuration sized to loosely engage the tip cavity 1410 in the planetary rotor 106'. The thickness of the end cap 306' is substantially the same as the depth of the cavity 1410 in the planetary rotor 106'.

The outward face of the end cap 306' has a pair of cap sealing slots 1404 that align with the planetary rotor sealing slots 1402 in the surface of the planetary rotor 106'. With the end cap 306' received in the cavity 1410, the outer surface of the end cap 306' is substantially flush with the surface of the planetary rotor 106' and the planetary rotor seals fit into the slots 1402, 1404 and hold the end cap 306' in the cavity 1410. In this way, the end caps 306' also prevent the tip seals 100-T", 100-L" from sliding out of their respective slots 1406, 1408.

Figure 18:
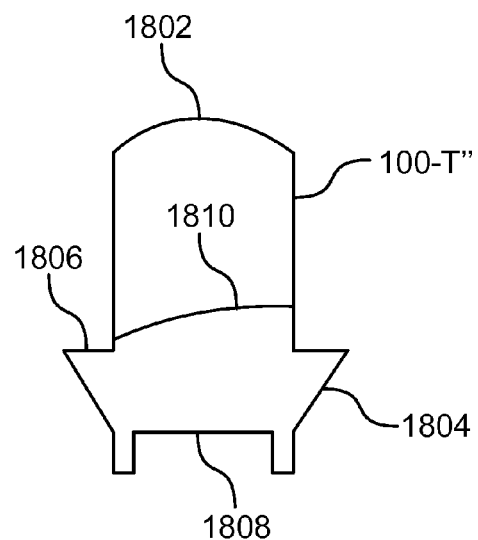
FIG. 18 is a plan view of the embodiment of the trailing tip seal illustrated in FIG. 14.
Figure 19:
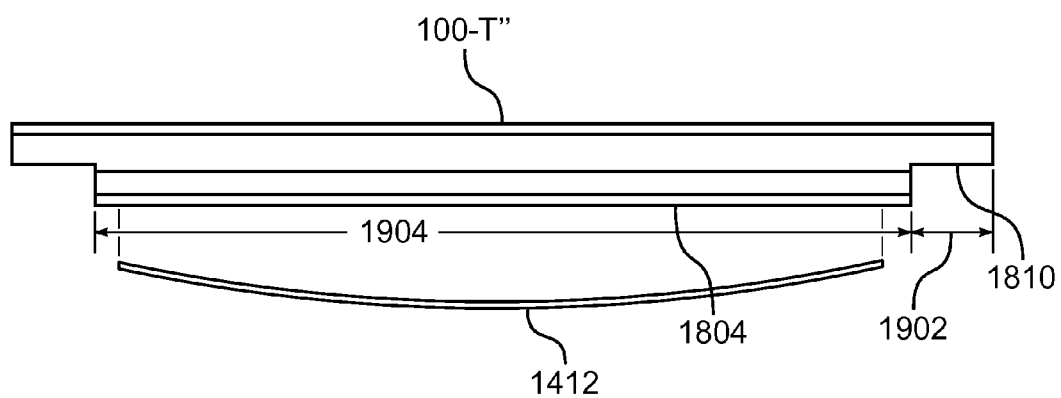
FIG. 19 is a side view of the embodiment of the trailing tip seal illustrated in FIG. 14.

FIG. 18 illustrates a plan view of the embodiment of the trailing tip seal 100-T" illustrated in FIG. 14. FIG. 19 illustrates a side view of the embodiment of the trailing tip seal 100-T" illustrated in FIG. 14. The trailing tip seal 100-T" is elongated with a contact surface 1802 opposite a captive portion 1804. The contact surface 1802 is parallel to the longitudinal axis of the trailing tip seal 100-T". In one embodiment, the contact surface 1802 has an arcuate profile in a plane normal to the longitudinal axis of the trailing tip seal 100-T". In one such embodiment, the contact surface 1802 has a partial circular cross section. The captive portion 1804 slidably moves in the slot 1406 between the first surface 116 and the tip surface 138 of the tip 130-B.

The captive portion 1804 has a configuration that engages the slot 1406 such that the trailing tip seal 100-T" is captive in the slot 1406 with limited movement of the contact surface 1802 relative to the planetary rotor 106'. The captive portion 1804 has a recess 1808 that receives a portion of the wave spring 1302, which biases the trailing tip seal 100-T'" away from the planetary rotor 106'. Extending from the captive portion 1804 are a pair of ledges, or shelves, 1806 that engage corresponding surfaces 1704 in the slot 1406. The engagement of the surfaces 1704 by the ledges 1806 defines a limit of outward travel of the trailing tip seal 100-T" away from the planetary rotor 106'.

The captive portion 1804 has a length 1904 that is substantially the same or less than the length of the slot 1406. Between the captive portion 1804 and the distal ends of the trailing tip seal 100-T" is a gap 1902 that is substantially equal to the thickness of the end cap 306'. The trailing tip seal 100-T" has a surface 1810 that extends from the captive portion 1804 to the distal end of the trailing tip seal 100-T". This surface 1810 has an arcuate shape that conforms to the cylindrical perimeter of the end cap 306'.

The surface 1810 is positioned such that, in one embodiment, the surface 1810 contacts the cylindrical perimeter of the end cap 306', thereby defining one limit of the range of motion of the trailing tip seal 100-T". The surface 1810 is positioned such that the surface 1810 does not contact the cylindrical perimeter of the end cap 306' when the trailing tip seal 100-T" is at its limit of the range of motion toward the bottom of the slot 1406. The sides of the recess 1808 engage the bottom of the slot 1406 to define the limit of the range of motion toward the bottom of the slot 1406. With these features, the inside surface of the end cap 306' prevents the captive portion 1804 from sliding laterally out of the slot 1406. Also, the distal end of the trailing tip seal 100-T" is substantially flush with the outer surface of the planetary rotor 106'.

FIG. 19 illustrates a leaf spring 1412 displaced from the captive portion 1804. The leaf spring 1412 is shown with its two ends positioned to engage the recess 1808 in the trailing tip seal 100-T". The leaf spring 1412 has a length that is less than the length of the captive portion 1804 such that the recess 1808 contains the leaf spring 1412 when the spring 1412 is collapsed flat. The medial portion of the leaf spring 1412 engages the inside of the slot 1406. With this configuration, the spring force from the leaf spring 1414 is distributed to two points on the trailing tip seal 100-T" and one point on the planetary rotor 106', which is more massive than the tip seals 100 and able to receive the spring force without deformation of the planetary rotor 106'

Figure 20:
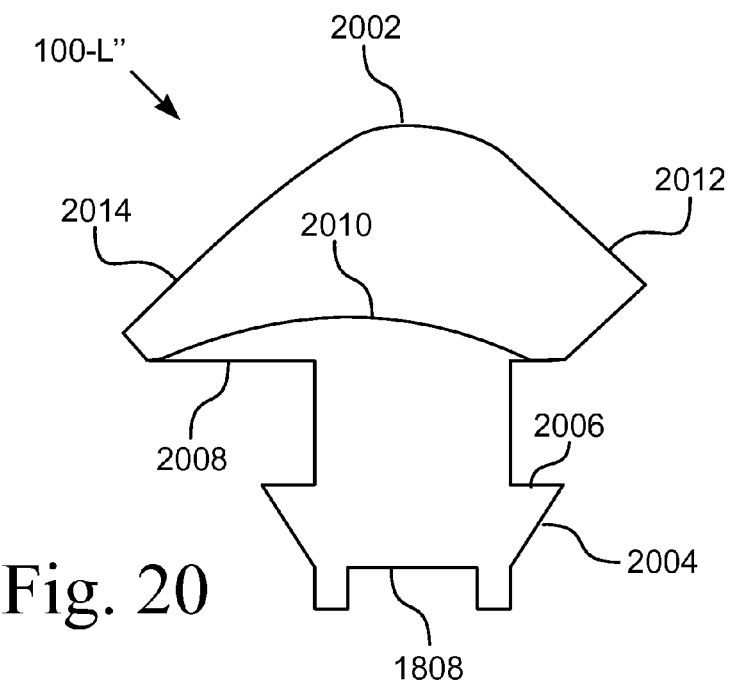
FIG. 20 is a plan view of the embodiment of the leading tip seal illustrated in FIG. 14.
Figure 21:
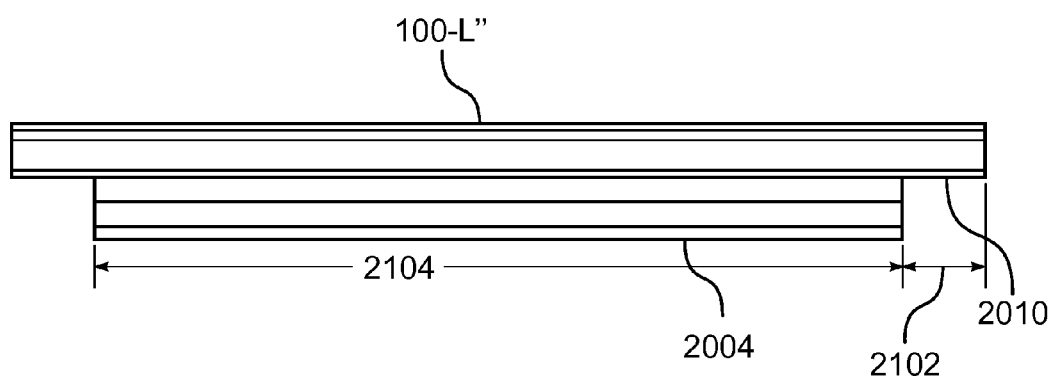
FIG. 21 is a side view of the embodiment of the leading tip seal illustrated in FIG. 14.

FIG. 20 illustrates a plan view of the embodiment of the leading tip seal 100-L" illustrated in FIG. 14. FIG. 21 illustrates a side view of the embodiment of the leading tip seal 100-L" illustrated in FIG. 14. The leading tip seal 100-L" is elongated with a contact surface 2002 opposite a captive portion 2004. The contact surface 2002 is parallel to the longitudinal axis of the leading tip seal 100-L". The contact surface 2002 has a configuration with a leading portion 2012 and a trailing portion 2014. In one embodiment, the contact surface 2002 has an arcuate profile in a plane normal to the longitudinal axis of the leading tip seal 100-L". The leading portion 2012 and the trailing portion 2014 are joined with an arcuate surface. In one embodiment, such arcuate surface has a partial circular profile or cross-section and the leading and trailing portions 2012, 2014 are slightly convex surfaces in profile or cross-section. The configuration of the contact surface 2002 is such to provide a transition between the surfaces of the internal cavity 124 and the surfaces of the cutouts 126 as the planetary rotor 106' moves in the rotary engine 102.

The leading tip seal 100-L" slidably moves in the slot 1408 between the second surface 118 and the tip surface 138 of the tip 130-B. The captive portion 2004 has a configuration that engages the slot 1408 such that the leading tip seal 100-L" is captive in the slot 1408 with limited movement of the contact surface 2002 relative to the planetary rotor 106'. The captive portion 2004 has a recess 1808 that receives a portion of the wave spring 1302, which biases the leading tip seal 100-L" away from the planetary rotor 106'. Extending from the captive portion 2004 are a pair of ledges, or shelves, 2006 that engage corresponding surfaces 1714 in the slot 1408. The engagement of the surfaces 1714 by the ledges 2006 defines a limit of outward travel of the leading tip seal 100-L" away from the planetary rotor 106'.

The captive portion 2004 has a length 2104 that is substantially the same or less than the length of the slot 1408. Between the captive portion 2004 and the distal ends of the leading tip seal 100-L" is a gap 2002 that is substantially equal to the thickness of the end cap 306'. The leading tip seal 100-L" has a surface 2010 that extends from the captive portion 2004 to the distal end of the leading tip seal 100-L". This surface 2010 has an arcuate shape that conforms to the cylindrical perimeter of the end cap 306'. The surface 2010 is positioned such that the surface 2010 does not contact the cylindrical perimeter of the end cap 306' when the leading tip seal 100-L" is at its limit of the range of motion toward the bottom of the slot 1408. In one embodiment, the surface 2008 on each side of the captive portion 2004 engages corresponding surfaces on the planetary rotor to define the limit of the range of motion toward the bottom of the slot 1408. With these features, the inside surface of the end cap 306' and the spring 1412 prevent the captive portion 2004 from sliding laterally out of the slot 1408. Also, the distal end of the leading tip seal 100-L" is substantially flush with the outer surface of the planetary rotor 106'.

Figure 22:
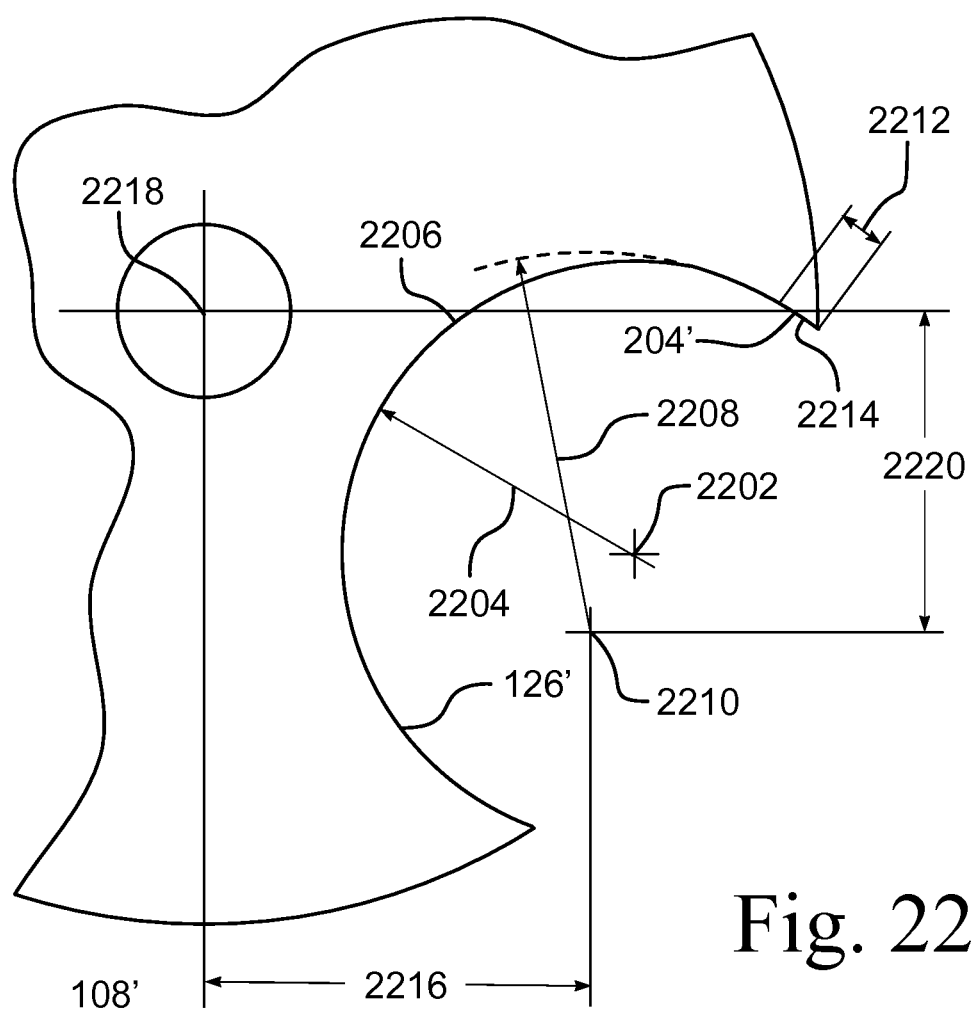
FIG. 22 is a partial plan view of another embodiment of the main rotor.

FIG. 22 illustrates a partial plan view of another embodiment of the main rotor 108' showing one cutout 126'. The surface of the cutout 126' has two cylindrical regions 2206, 2214. The first cylindrical region 2206 is defined by a first radius 2204 extending from a first center 2202 of the cutout 126'.

The second cylindrical region 2214 defines the forward surface 204' and has a length 2212. The second cylindrical region 2214 is defined by a second radius 2208 extending from a second center 2210 offset from the first center 2202 of the cutout 126'. The second center 2210 is defined by the intersection of a first offset 2214 and a second offset 2216 from the center 2218 of the main rotor 108' with the cutout 126' positioned as illustrated in FIG. 22. The second center 2210 is positioned such that the second cylindrical region 2214 is dimensioned to provide a graduated entry zone, or forward surface, 204' for the trailing tip seal 100-T" when it engages the cutout 126'. The forward surface 204' allows the tip seals 100-T", 100-L" to engage the cutout 126' with the tip seals 100-T", 100-L" fully extended and to be gradually moved against the bias of the leaf spring 1412 as the tip seals 100-T", 100-L" engage the first cylindrical region 2206.

The second cylindrical region 2214 joins the first cylindrical region 2206 at a tangent defined by a line passing through the first center 2202 and the second center-point 2210.

Figure 23:
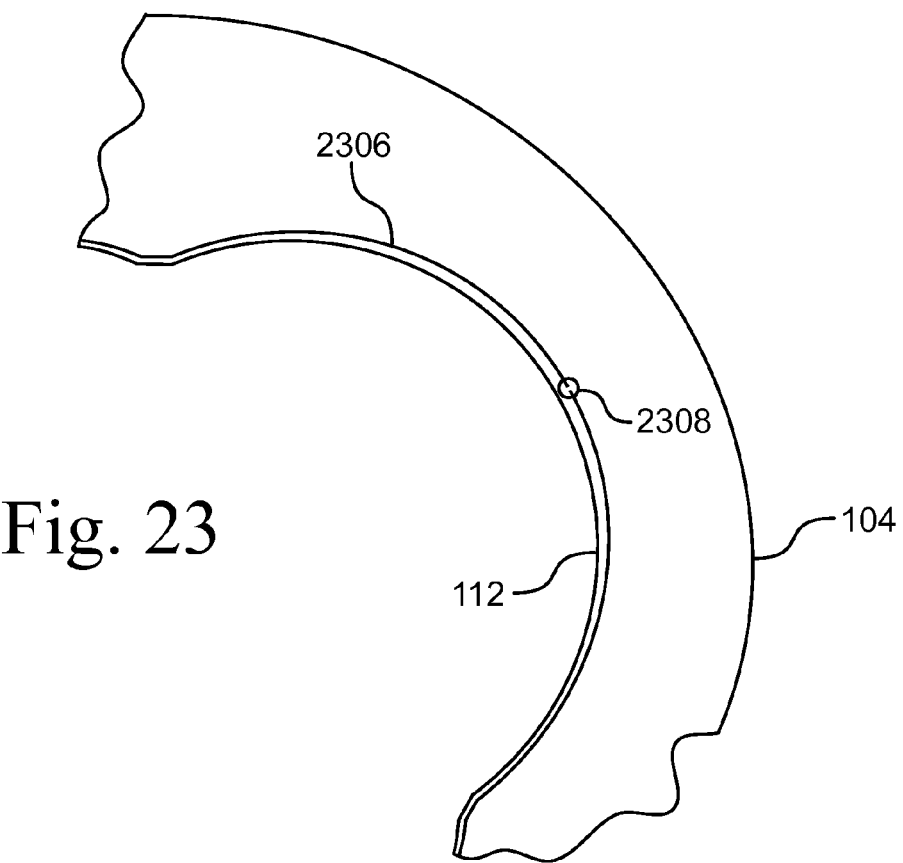
FIG. 23 is a partial plan view of one embodiment of a housing showing the side seal.
Figure 24:
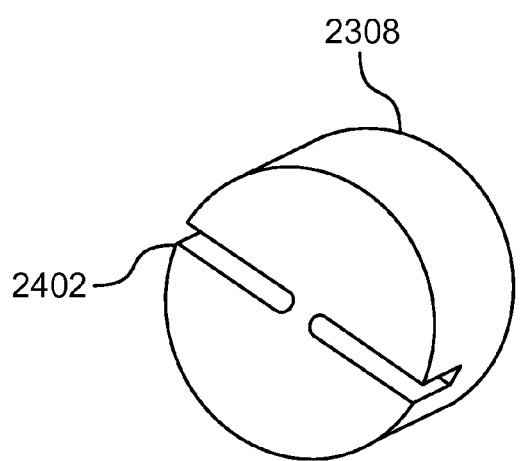
FIG. 24 is a perspective view of one embodiment of a housing button seal.
Figure 25:
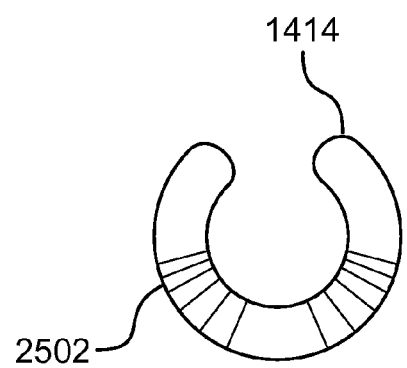
FIG. 25 is a plan view of one embodiment of a spring washer.

FIG. 23 illustrates a partial plan view of one embodiment of a housing 104 showing the side seal 2306. FIG. 24 illustrates a perspective view of one embodiment of a housing button seal 2308. FIG. 25 illustrates a plan view of one embodiment of a spring washer 1414.

The housing 104 includes a side surface that engages a rotating plate that supports the movable members 106, 106'. The side surface, or face, of the housing 104 has a housing slot that is adjacent to and follows the contour of the lobes 112. The housing slot receives a spring and a seal 2306 that are similar to the seal spring 1418 and seal 1416 for the planetary rotor 106'. Three housing seals 2306 are used to seal the periphery of the housing cavity. A housing button 2308 with a pair of button slots 2402 fit into a cavity that intersects the housing slot.

In the illustrated embodiment, the buttons 2308 joining adjacent seals 2306 are located proximate the midpoint of the lobe 112. The midpoint of the lobe 112, for one type of rotary engine, is exposed to a lower pressure than other portions of the lobe 112. The location of the button 2308 proximate the low pressure region reduces the potential leakage by the gap between the housing seals 2306 that terminate in the button slots 2402.

A spring 1414 fits between the button 2308 and the cavity bottom. The spring 1414 has a twist 2502 that renders the spring 1414 non-planar such that the two ends of the spring 1414 apply a spring force to one of the button and the cavity bottom. The spring 1414 biases the button 2308 away from the surface of the housing 104 and provides support to the ends of the housing seals 2306.

In operation, the dual tip seals 100 maintain the pressure integrity of the chamber defined by the planetary rotor 106 and the lobes 112 during the compression and combustion cycles for each face 116, 118 of the rotor 106. For example, FIG. 1 illustrates the engine 102 with the main rotor 108 rotated a few degrees past top dead center. The first face 116 defines a chamber that is in the combustion cycle. The fuel from the fuel injector 141 is combusting in the chamber and the chamber has a high pressure from the combustion. One distal end of the first face 116 has a trailing seal 100-T and the opposite distal end of the first face has a leading seal 100-L. Both seals 100-T, 100-L are engaging the surface of the lobe 112. The seals 100-T, 100-L are biased against the surface of the lobe 112 by way of a spring 1202, 1302, 1412. Also, the ports 1006 in the first face 116 transfer a portion of the pressure in the chamber to the space under the seals 100-T, 100-L, which further biases the seals 100-T, 100-L toward the surface of the lobe 112. The bias force 406 from the springs 1202, 1302, 1412 and the combustion pressure communicating through the ports 1006 ensures that the seals 100-T, 100-L are forced against the surface of the lobe 112 with sufficient force to maintain a seal of the combustion chamber.

The planetary rotor 106 orbits clockwise when viewed as shown in the figures. As the combustion cycle continues, the planetary rotor 106 orbits into a position such as illustrated in FIG. 2A. The leading seal 100-L engages the surface of the cutout 126, first encountering the forward surface 204'.

From the combustion cycle, the planetary rotor 106 continues its orbit until the exhaust cycle begins. Continuing along its orbit, the exhaust cycle transitions into the intact cycle for the first surface 116. For both the exhaust and intake cycles, the pressure in the chamber is reduced from that of the combustion cycle. The primary bias force 406, 412 is from the spring 1202, 1302, 1412. As the first surface 116 transitions into the exhaust cycle, the pressure built up under the seals 100-T, 100-L during the compression and combustion cycles likewise exhausts through the ports 1006, thereby reducing the pressure bias force 426, 422.

The compression cycle begins after the intake cycle. At the beginning of the compression cycle, the leading seal 100-L is engaging the cutout 126 and the trailing seal 100-T is engaging the lobe 112. As the pressure builds up during the compression cycle, the pressure is communicated through the ports 1006 and the pressure bias force 426, 422 increases, thereby increasing the bias force 406, 412 to main pressure integrity of the chamber.

The corner seals 100 for a rotary engine 102 includes various functions. The function of sealing the interface between the tip 130 of a rotor 108 and the lobe 112 of a rotary engine 102 is implemented, in one embodiment, by a leading corner seal 100-L and a trailing corner seal 100-T being biased to protrude above the tip surface 138. The corner seals 100 are biased such that gaps created by thermal expansion and manufacturing tolerances are filled. In this way, a compliant and durable seal is provided during operation of the rotary engine 102.

The function of sealing the interface between a tip 130 having dual corner seals 100 and the lobe 112 of a rotary engine 102 is implemented, in one embodiment, by an asymmetrical lobe 112 configuration that provides a smooth transition as the tip 130 traverses the lobe 112.

The function of minimizing components that need to be replaced during normal use is implemented, in one embodiment, by removable corner seals 100. The corner seals 100 are certain to deteriorate during normal use. A separable corner seal 100 provides a lower cost way to replace the corner seals 100 than the alternative of replacing the rotor 108.

From the foregoing description, it will be recognized by those skilled in the art that biased corner seals 100 and an asymmetrical lobe 112 for a rotary engine 102 have been provided. Where the rotary engine 102 includes an internal cavity, a main rotor, and a plurality of planetary rotors 106, the corner seals 100 are disposed on the planetary rotors 106. The planetary rotors 106 include a plurality of vanes 132. The vanes 132 include two surfaces: the first surface 116 and the second surface 118. The two surfaces 116, 118 terminate at a tip surface 138 forming two corners 134, 136. The leading corner seal 100-L is disposed at the leading corner 136. The trailing corner seal 100-T is disposed at the trailing corner 134.

The internal cavity includes a plurality of lobes 112. The main rotor 108 rotates about a main shaft 110 within the lobes 112. The planetary rotors 106 orbit the main shaft 110. The planetary rotors 106 are located between the lobes 112 and a cutout 126 in the main rotor 108. The tips 130 of the vanes 132 slide about the surfaces of the lobes 112 and the cutout 126. The corner seals 100 are biased away from the corners 134, 136 of the vane 132. Being biased, the corner seals 100 apply force against lobes 112 and the cutout 126. The gaps that exist due to thermal expansion and/or manufacturing tolerances are filled by the biased corner seals 100 such that a compliant and durable seal exists along the sealing surfaces.

The asymmetrical lobe 112' provides an improved transition zone 802. The transition zone 802 is where the two corner seals 100-L, 100-T alternate making contact with the lobe 112. While the planetary rotor 106 orbits the main shaft 110, the tips 130 of the vanes 132 pass over the lobe 112. The lobe 112 has three zones, the trailing zone 804, the leading zone 806, and the transition zone 802. In the trailing zone 804, the trailing corner seal 100-T makes a sealing connection with the surface of the lobe 112. In the leading zone 806, the leading corner seal 100-L. makes a sealing connection with the surface of the lobe 112. Where the main rotor 108 turns clockwise 122, the corner seals 100 alternate from the trailing corner seal 100-T to the leading corner seal 100-L in the transition zone 802. The asymmetrical lobe 112' provides a gradual transition such that a sealing connection is maintained during the transition.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. An apparatus for sealing a connection between a moving member and a housing of an internal combustion engine, the moving member having a tip with a leading edge and a trailing edge, said apparatus comprising:
   a first seal having a first length along a first longitudinal axis, said first seal having a first captive portion with a first captive length, said first captive portion configured to slidably engage a first slot in the leading edge of the moving member in a direction perpendicular to said first longitudinal axis, said first seal having a first contact surface, said first contact surface being parallel with said first longitudinal axis, said first contact surface having an arcuate profile in a plane normal to said first longitudinal axis, said first contact surface configured to slidingly engage a surface that is parallel to said first longitudinal axis, said first seal configured to be biased away from said first slot;

a second seal having a second length along a second longitudinal axis, said second seal having a second captive portion with a second captive length, said second captive portion configured to slidably engage a second slot in the trailing edge of the moving member in a direction perpendicular to said second longitudinal axis, said second seal having a second contact surface, said second contact surface being parallel with said second longitudinal axis, said second contact surface having an arcuate profile in a plane normal to said second longitudinal axis, said second contact surface configured to slidingly engage said surface that is parallel to said second longitudinal axis, and said second seal configured to be biased away from said second slot; and said housing defining a plurality of lobes, each one of said plurality of lobes being asymmetrical with a lobe surface defining a trailing zone, a transition zone, and a leading zone, said trailing zone having a curvature allowing said second contact surface to engage said lobe surface with said first contact surface not engaging said lobe surface when said first seal and said second seal are proximate said trailing zone, said transition zone having a curvature allowing said first and second contact surfaces to engage said lobe surface when said first seal and said second seal are proximate said transition zone, and said leading zone having a curvature allowing said first contact surface to engage said lobe surface with said second contact surface not engaging said lobe surface when said first seal and said second seal are proximate said leading zone.

2. The apparatus of claim 1 further including a movable member and a main rotor, said movable member being a planetary rotor configured to orbit around an axis of rotation of said main rotor with said movable member inside a cutout in said main rotor, said first and second contact surfaces of said first and second seals, respectively, engaging a surface of said cutout to form a seal between said surface of said cutout and said movable member.

3. The apparatus of claim 2 further including a first spring disposed between said first captive portion and a bottom of said first slot wherein said first spring biases said first seal away from the movable member, and further including a second spring disposed between said second captive portion and a bottom of said second slot wherein said second spring biases said second seal away from the movable member.

4. The apparatus of claim 2 wherein said first captive portion is restrained from being removed from said first slot in the movable member in a direction normal to said first longitudinal axis, and said second captive portion is restrained from being removed from said second slot in the movable member in a direction normal to said second longitudinal axis.

5. The apparatus of claim 2 wherein said cutout is defined by a first cylindrical region and a second cylindrical region, said second cylindrical region has a diameter greater than a diameter of said first cylindrical region, said second cylindrical region extends from one edge of said cutout to said first cylindrical region, wherein said first and second seals enter said cutout proximate said second cylindrical region and each one of said first and second seals is gradually moved against a bias as said first and second seals engage said first cylindrical region.

6. The apparatus of claim 2 further including a first conduit with fluid communication between said first slot and a first surface of said movable member that is proximate said first slot whereby a fluid pressure applied to said first surface passes through said first conduit and pressurizes a space between said first slot and said first captive portion, thereby biasing said first seal away from said first slot.

7. The apparatus of claim 2 wherein said first contact surface includes a leading portion and a trailing portion joined with a surface having a first partial circular profile, said leading and trailing portions each having a convex profile defined by a radius greater than a radius of said first partial circular profile, and said second contact surface having a second partial circular profile.

8. The apparatus of claim 2 wherein said arcuate profile of said second contact surface is a partial circular profile.

9. The apparatus of claim 2 further including
a first end cap having a first inside surface configured to be proximate a first distal end of said first captive portion and a first distal end of said second captive portion, said first inside surface proximate a first side of the moving member, and said first end cap is configured to keep said first captive portion of said first seal and said second captive portion of said second seal from sliding longitudinally out of said first and second slots, respectively; and
a second end cap having a second inside surface configured to be proximate a second distal end of said first captive portion and a second distal end of said second captive portion, said second inside surface proximate a second side of the moving member, and said second end cap is configured to keep said first captive portion of said first seal and said second captive portion of said second seal from sliding longitudinally out of said first and second slots, respectively.

10. The apparatus of claim 9 further including a first spring disposed between said first inside surface of said first end cap and said first side of the moving member wherein said first end cap is biased away from the moving member, and a second spring disposed between said second inside surface of said second end cap and said second side of the moving member wherein said second end cap is biased away from the moving member.

11. The apparatus of claim 9 further including a third seal configured to fit into a third slot located on said first side of the moving member, a distal end of said third seal engaging a first cap slot on said first end cap, said third seal biased away from said first side of the moving member, and further including a fourth seal configured to fit into a fourth slot located on said first side of the moving member, a distal end of said fourth seal engaging a second cap slot on said first end cap, said fourth seal biased away from said first side of the moving member.

12. The apparatus of claim 2 further including said housing and a plurality of side seals, said housing having a side surface configured to be proximate a rotating plate, said housing defining a plurality of lobes, said side surface having a housing slot proximate said plurality of lobes, said housing slot dimensioned and configured to receive said plurality of side seals biased away from said housing, said side surface having at least one recess sized to receive a button with a sliding engagement, and said button biased away from said housing, said button having at least one button slot sized to receive a distal end of one of said side seals.

13. The apparatus of claim 12 wherein said button is biased away from said housing by a spring washer disposed between said button and a bottom of said recess in said housing.

14. An apparatus for sealing in an internal combustion engine, said apparatus comprising:
- a housing having a lobe defining a cavity in said housing;
- a rotor within said cavity in said housing, said rotor having a pair of vanes with a rotor surface extending therebetween, said rotor surface defining a portion of a chamber in said housing, said rotor surface having a first distal end and an opposite distal end, said rotor having a first slot proximate said first distal end, said rotor having a second slot proximate said opposite distal end;
- a first seal having a first length along a first longitudinal axis, said first seal having a first captive portion, said first captive portion slidably engaging said first slot in a direction perpendicular to said first longitudinal axis, said first seal having a first contact surface, said first contact surface being parallel with said first longitudinal axis, said first contact surface having an arcuate profile in a plane normal to said first longitudinal axis, said first seal contiguous with said rotor surface;
- a first spring disposed between said first captive portion and a bottom of said first slot wherein said first spring biases said first seal away from said rotor;
- a first conduit between said rotor surface proximate said first distal end and said first slot whereby a pressure proximate said rotor surface is communicated to said bottom of said first slot;
- a second seal having a second length along a second longitudinal axis, said second seal having a second captive portion, said second captive portion slidably engaging said second slot in a direction perpendicular to said second longitudinal axis, said second seal having a second contact surface, said second contact surface being parallel with said second longitudinal axis, said second contact surface having an arcuate profile in a plane normal to said second longitudinal axis, said second seal contiguous with said rotor surface;
- a second spring disposed between said second captive portion and said second slot wherein said second spring biases said second seal away from said rotor; and
- a second conduit between said rotor surface proximate said second distal end and a bottom of said second slot whereby said pressure proximate said rotor surface is communicated to said bottom of said second slot;

wherein said rotor surface progressively cycles through an intake cycle, a compression cycle, a combustion cycle, and an exhaust cycle with said first and second seals providing a pressure boundary at said first and opposite distal ends of said rotor surface, and wherein during said compression cycle and said combustion cycle said pressure in said chamber biases said first and second seals away from said rotor.

15. The apparatus of claim 14 further including a main rotor having a cutout, said rotor configured to orbit about an axis of rotation of said main rotor with said rotor inside said cutout, said cutout is defined by a first cylindrical region and a second cylindrical region, said second cylindrical region having a second diameter greater than a first diameter of said first cylindrical region, said second cylindrical region extending from one edge of said cutout to said first cylindrical region, wherein said first and second seals enter said cutout proximate said second cylindrical region and each one of said first and second seals is gradually moved against a bias toward said rotor as said first and second seals engage said first cylindrical region.

16. The apparatus of claim 14 wherein said lobe is asymmetrical with a lobe surface defining a trailing zone, a transition zone, and a leading zone, said trailing zone having a curvature allowing said second contact surface to engage said lobe surface when said second seal is proximate said trailing zone, said transition zone having a curvature allowing said first contact surface to engage said lobe surface when said first seal is proximate said transition zone, said transition zone having a curvature allowing said second contact surface to engage said lobe surface when said second seal is proximate said transition zone, and said leading zone having a curvature allowing said first contact surface to engage said lobe surface when said first seal is proximate said leading zone.

17. The apparatus of claim 14 wherein said first captive portion of said first seal is restrained from being removed from said first slot in a direction normal to said first longitudinal axis, and said second captive portion of said second seal is restrained from being removed from said second slot in a direction normal to said second longitudinal axis.

18. The apparatus of claim 17 wherein said first captive portion has a first ledge configured to engage a corresponding first surface in said first slot whereby said first ledge engaging said corresponding first surface holds captive said first seal, and said second captive portion has a second ledge configured to engage a corresponding second surface in said first slot whereby said second ledge engaging said corresponding second surface holds captive said second seal.

* * * * *